United States Patent
Coleman

(10) Patent No.: US 7,560,909 B2
(45) Date of Patent: Jul. 14, 2009

(54) POWER CONVERTER USING EXTRAPOLATIVE CONDUCTANCE MODE CONTROL

(75) Inventor: Edward P. Coleman, Salt Springs, FL (US)

(73) Assignee: Asahi Kasei Microsystems Co., Ltd., Tokyo (JP)

( * ) Notice: Subject to any disclaimer, the term of this patent is extended or adjusted under 35 U.S.C. 154(b) by 555 days.

(21) Appl. No.: 11/273,452

(22) Filed: Nov. 14, 2005

(65) Prior Publication Data

US 2007/0108951 A1 May 17, 2007

(51) Int. Cl.
G05F 1/656 (2006.01)
G05F 1/613 (2006.01)

(52) U.S. Cl. .......... 323/222; 323/282; 323/284

(58) Field of Classification Search ........ 323/222, 323/282, 284, 286
See application file for complete search history.

(56) References Cited

U.S. PATENT DOCUMENTS

| 5,343,382 | A | * | 8/1994 | Hale et al. | .......... 363/98 |
| 5,903,447 | A | | 5/1999 | Takahashi et al. | |
| 6,850,038 | B2 | * | 2/2005 | Arai et al. | ......... 320/132 |

2004/0095120 A1 * 5/2004 Kernahan .......... 323/282

OTHER PUBLICATIONS

Dixon, Jr., Lloyd H., Current-mode Control of Switching Power Supplies, 2001, Publisher: Texas Instruments, Inc.
Hartman, Mark, Inside Current-Mode Control, Power Designer, 2005, vol. 106, Publisher: National Semiconductor.
DC-DC Converter Tutorial, Dallas Semiconductor Maxim, Oct. 19, 2000.
An Overview of Switched-Mode Power Supplies, Application Note, Dec. 1988, vol. AN120, Publisher: Phillips Semiconductors.
Ridley, Ray, A More Accurate Current-Mode Control Model, 2001, Publisher: Texas Instruments Inc.
Venable, H. Dean, Current Mode Control, Venable Technical Paper #5, Publisher: Venable Industries.

* cited by examiner

*Primary Examiner*—Bao Q Vu
(74) *Attorney, Agent, or Firm*—Vincent K. Gustafson; Intellectual Property Technology Law

(57) ABSTRACT

Power converters employing extrapolative conductance mode (ECM) control utilize periodic current sampling and employ an extrapolation method to determine charge pulse duration. In preferred embodiments, the operating frequency of the converter is altered in response to current sample perturbations to dissipate sub-harmonic oscillations associated with duty cycles of 50% or greater without the use of slope correction. High current monitor signal-to-noise ratios may be achieved in conjunction with low power losses, and a first order output filter response may be obtained for duty cycles greater than 50%.

63 Claims, 23 Drawing Sheets

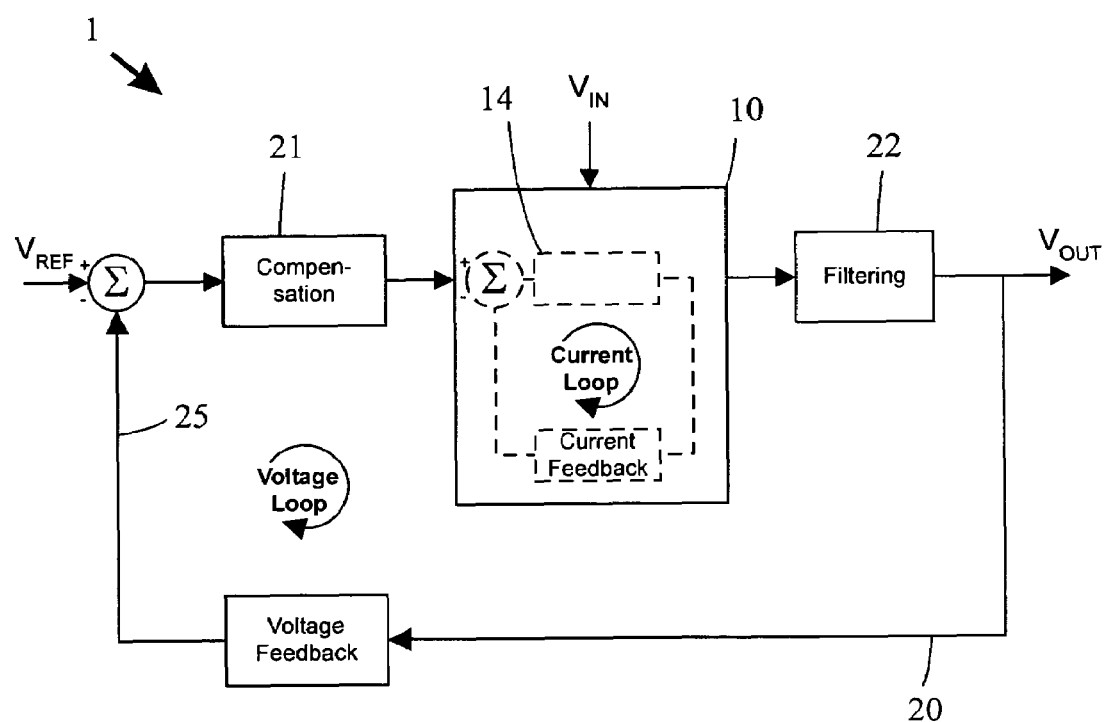
FIG._1
[PRIOR ART]

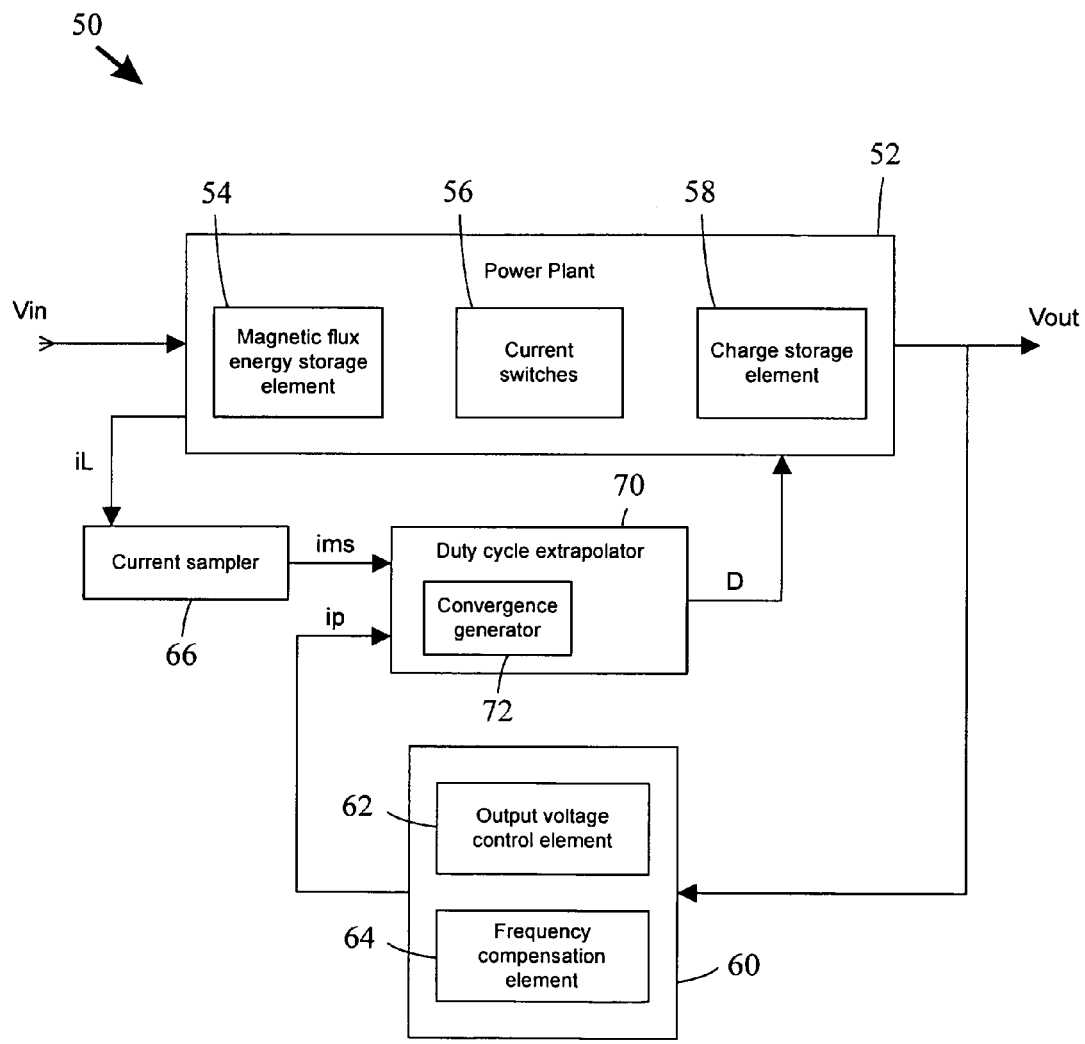
FIG._2

$io*(1/m1-1/m2) < tsk < io*(1/m1+1/m2)$ $tsk = io/m1$ for one cycle correction as D approaches 1.

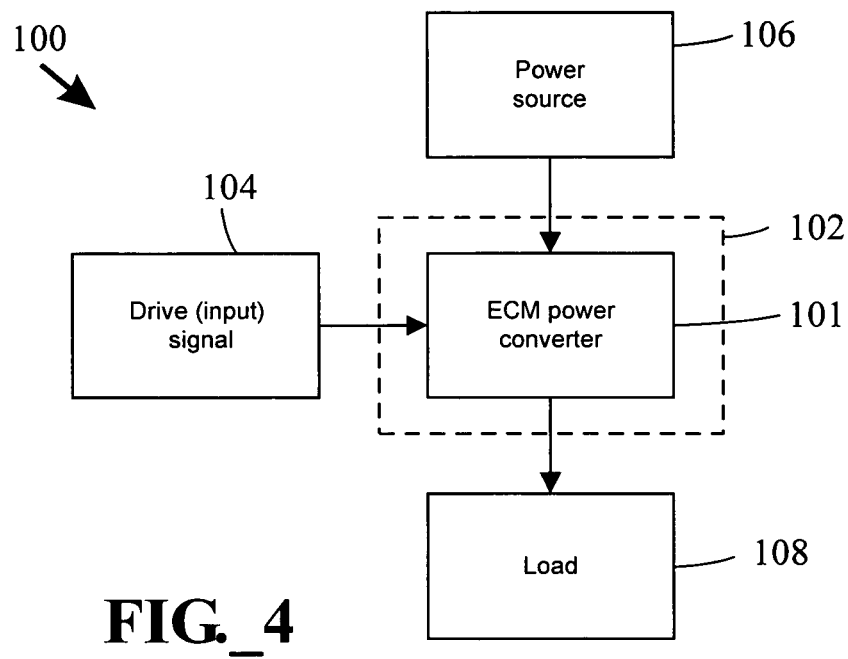
FIG._4
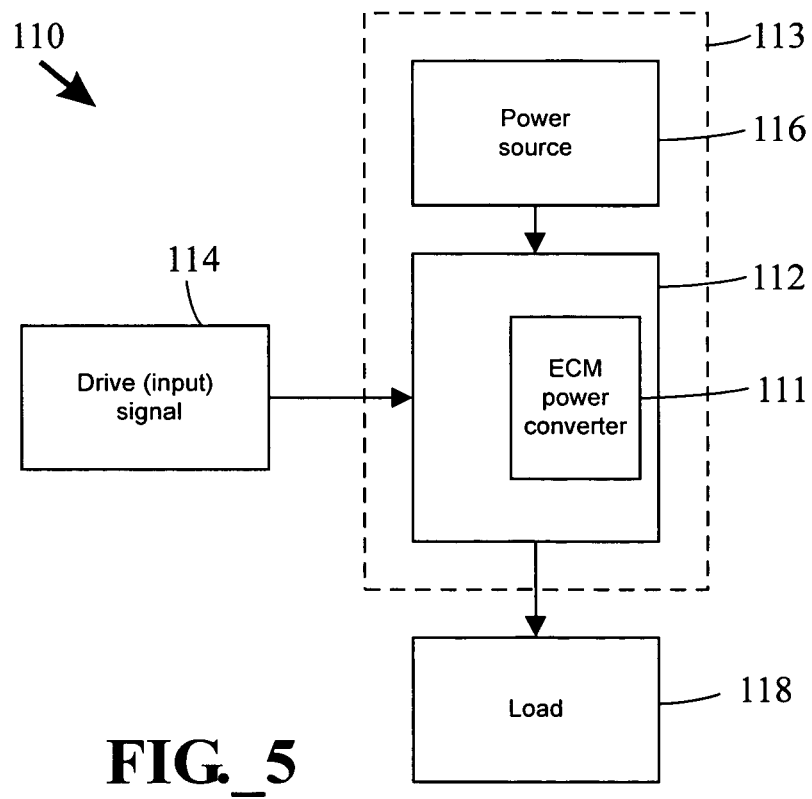
FIG._5

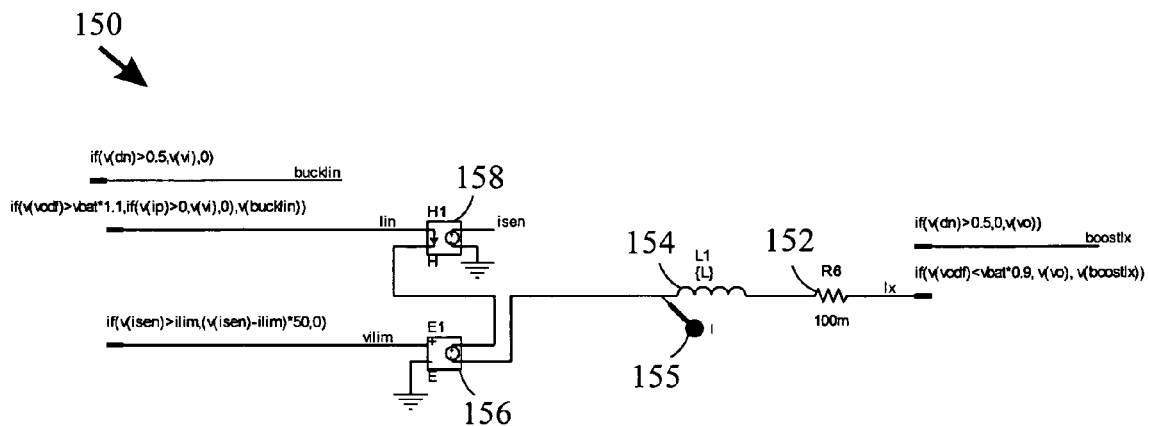
FIG._7
PARAMETERS:
voset = 0.8
voset2 = 2.00
vbat = 3.6
L = 4.7u
io = 500m
ilim = 1.8
freq = 1Meg
FIG._6

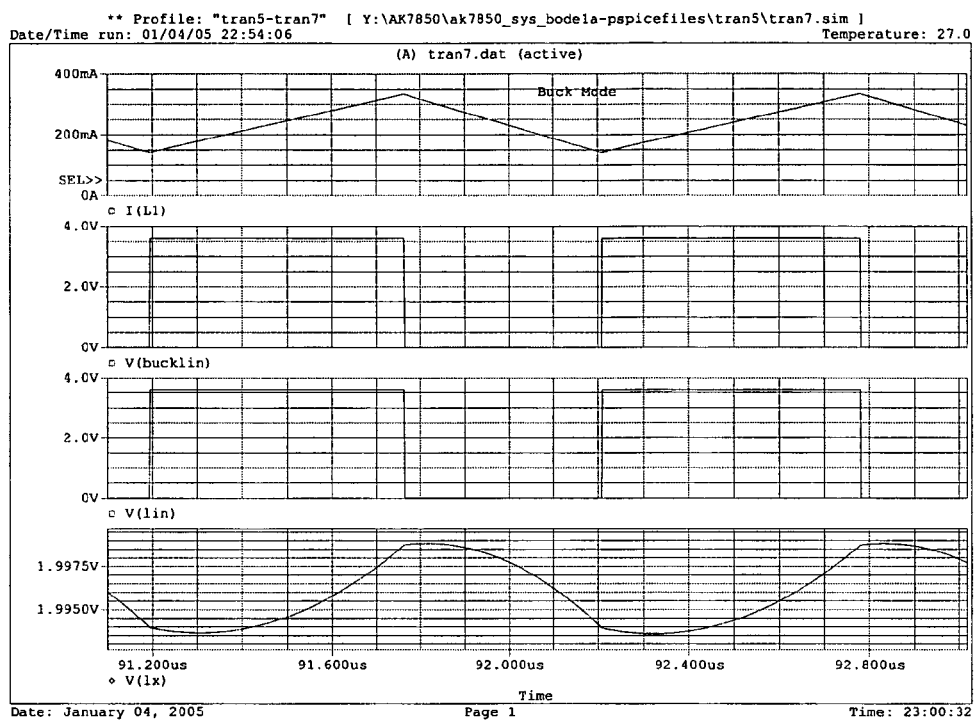
FIG._8
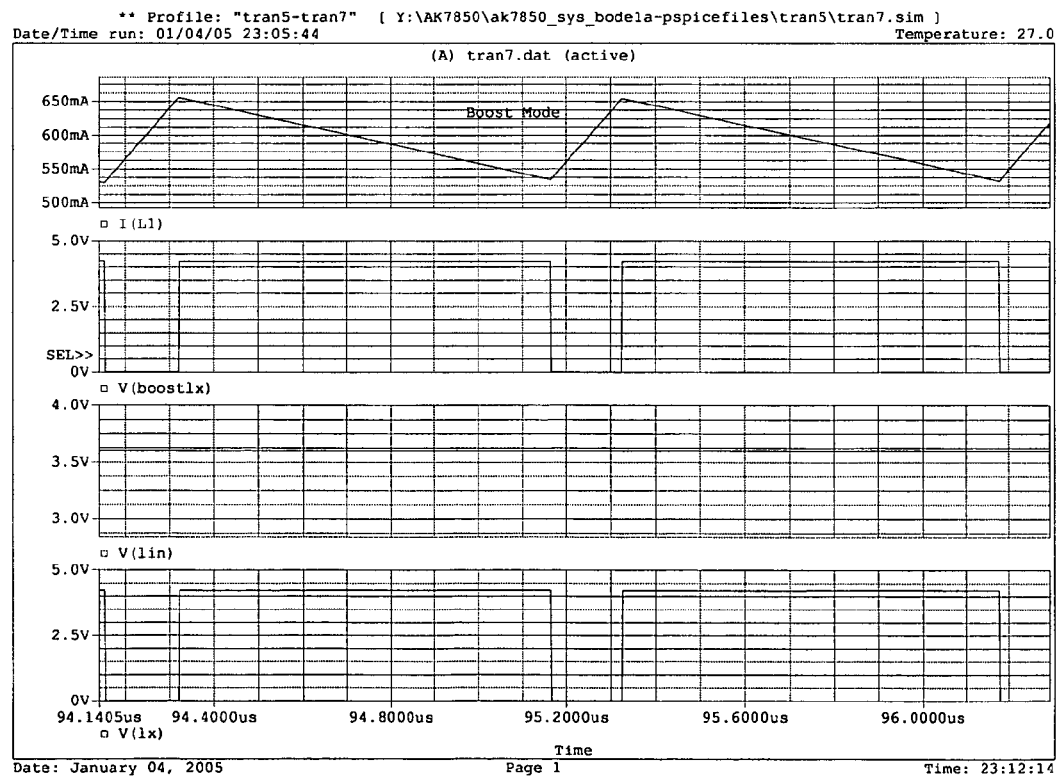
FIG._9

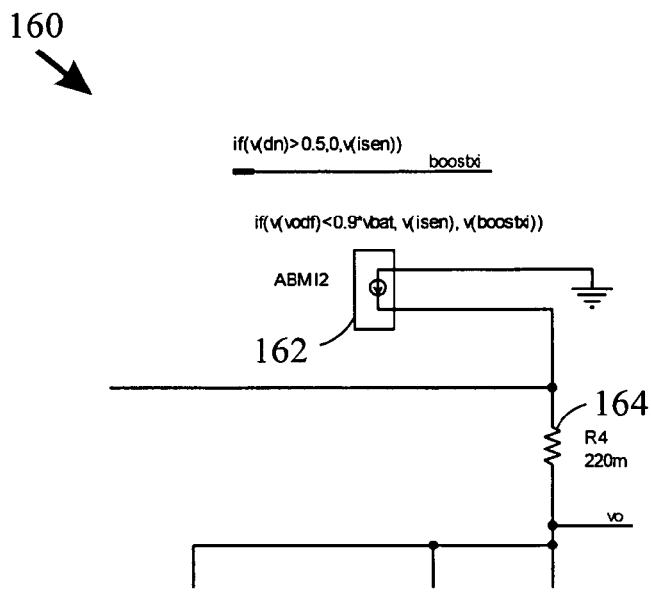
FIG._12
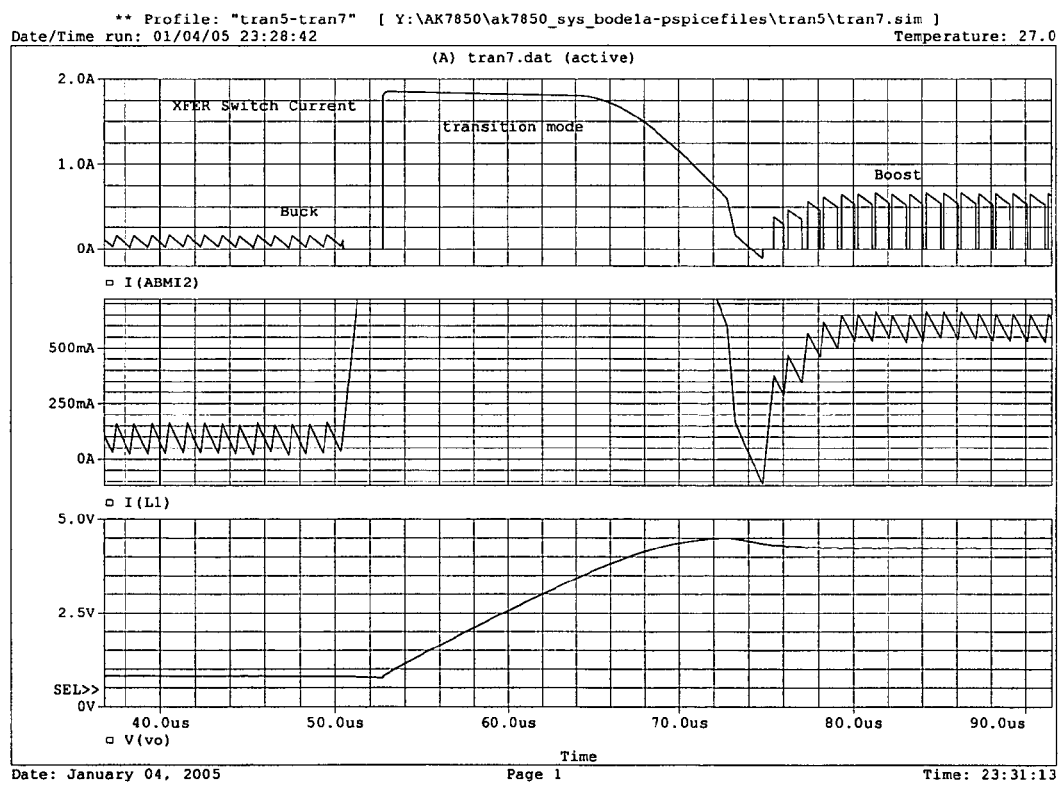
FIG._13

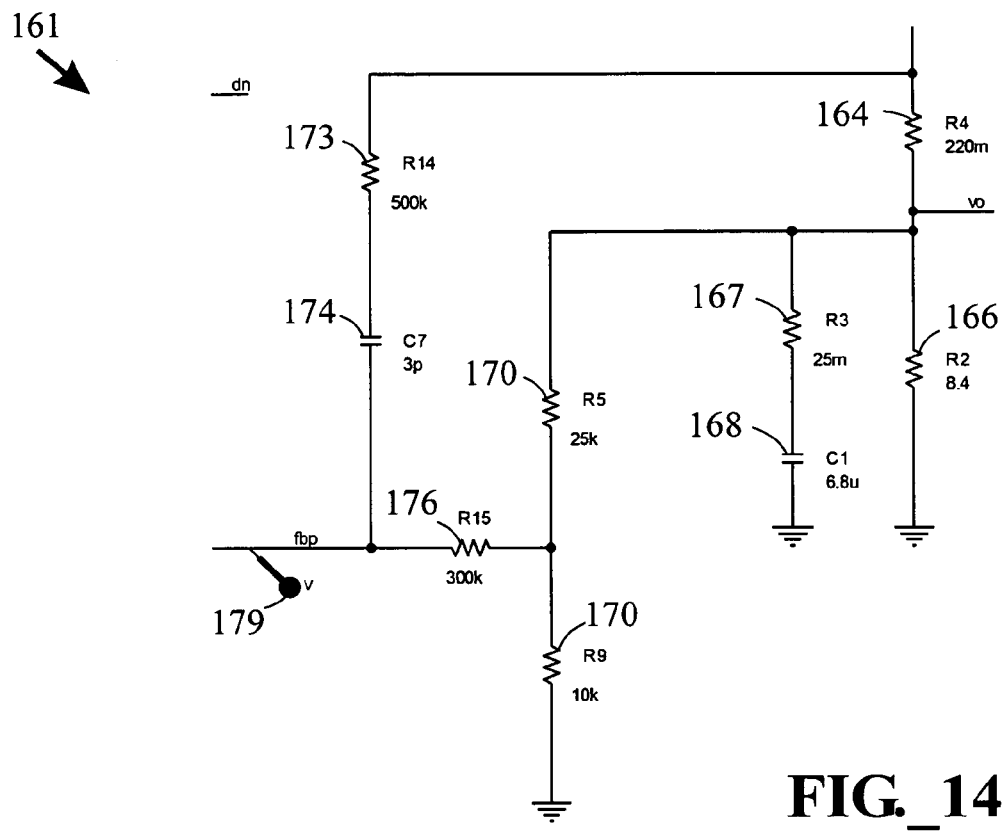
FIG._14
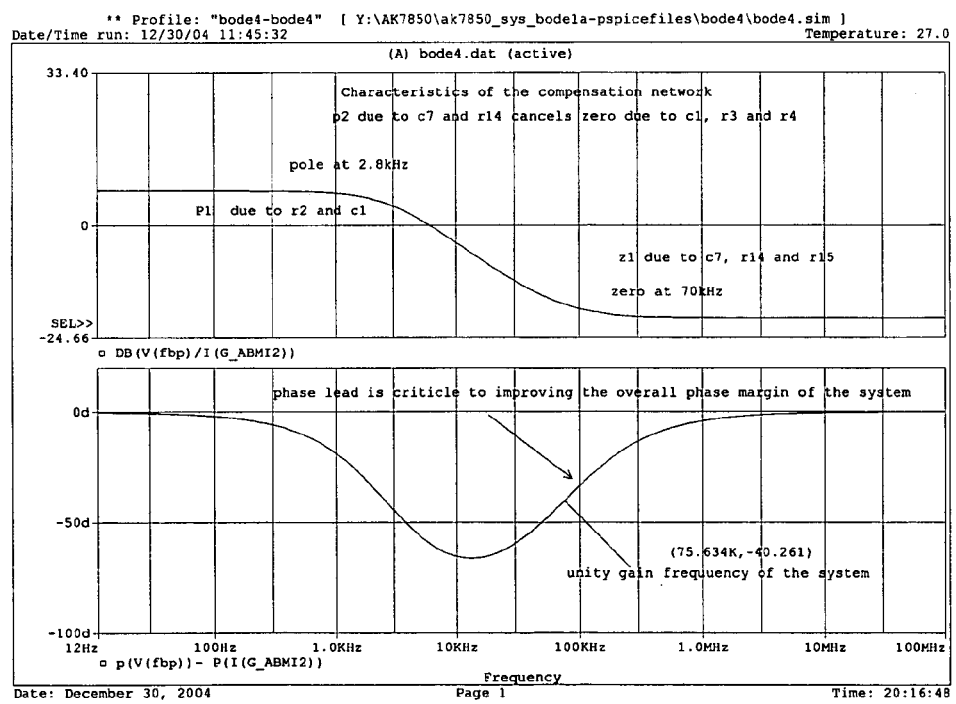
FIG._15

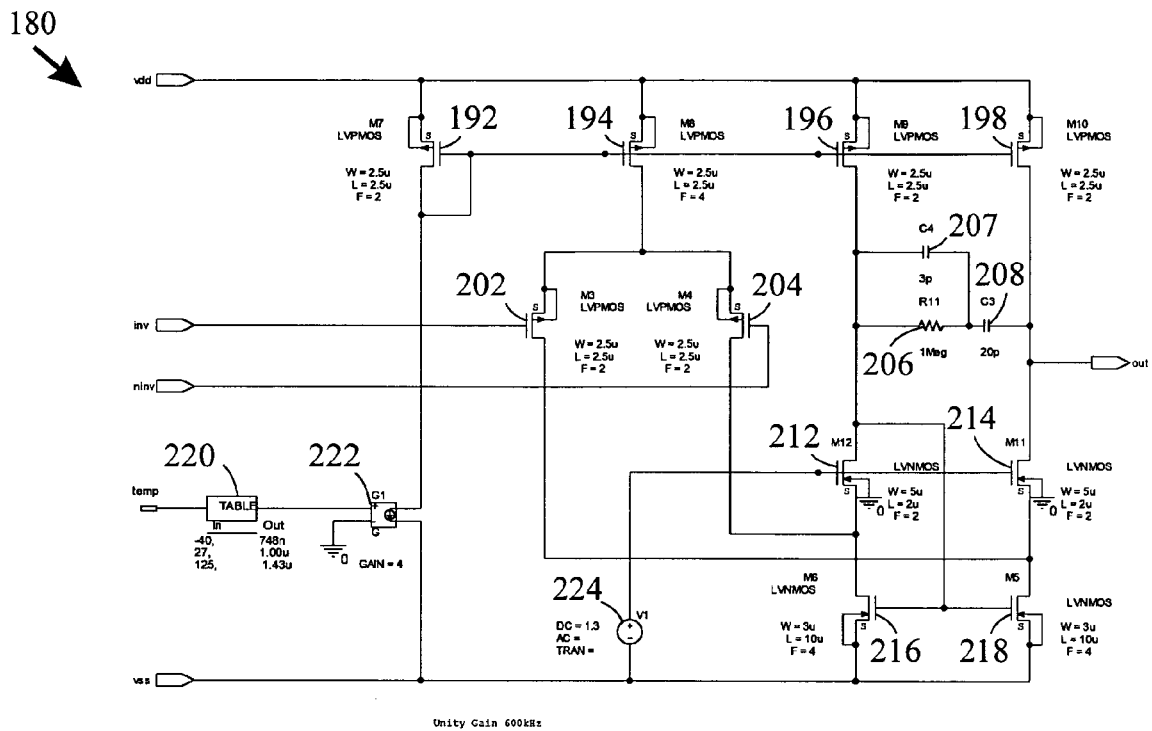
FIG._16
FIG._17

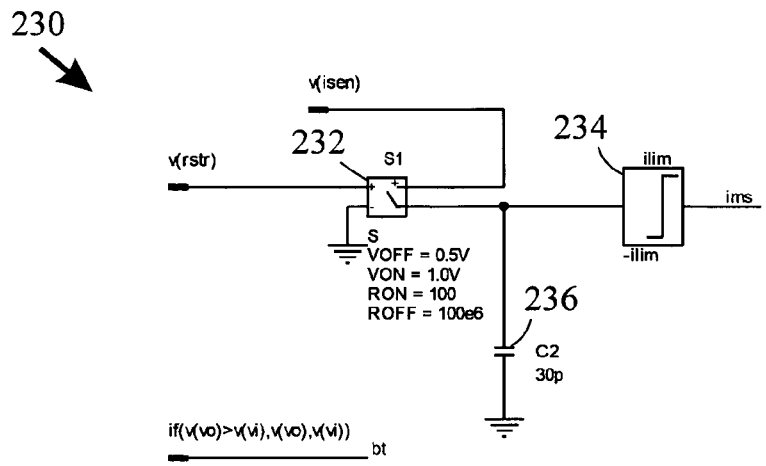
FIG._18
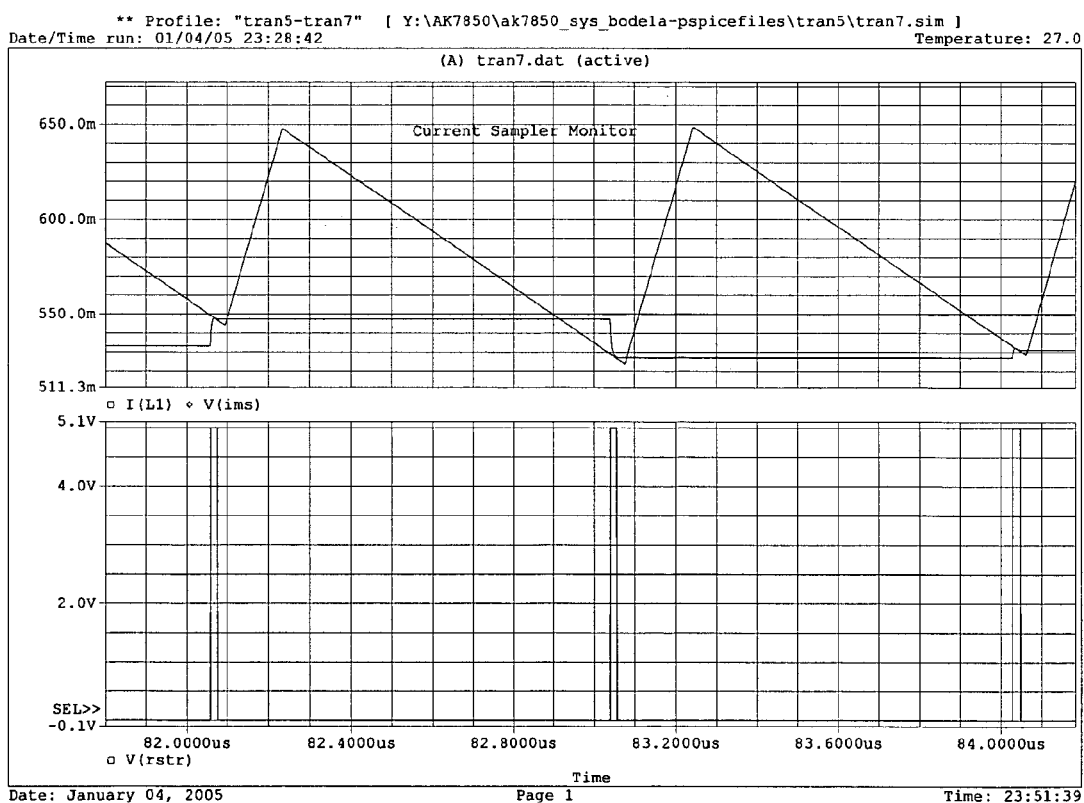
FIG._19

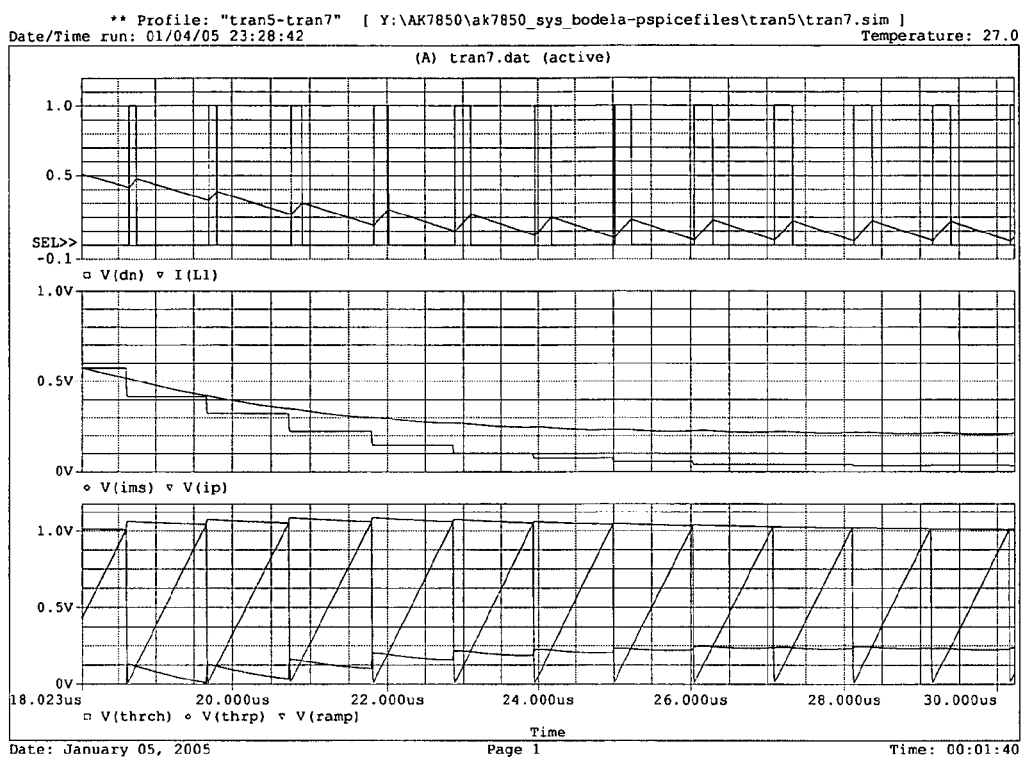
FIG._21
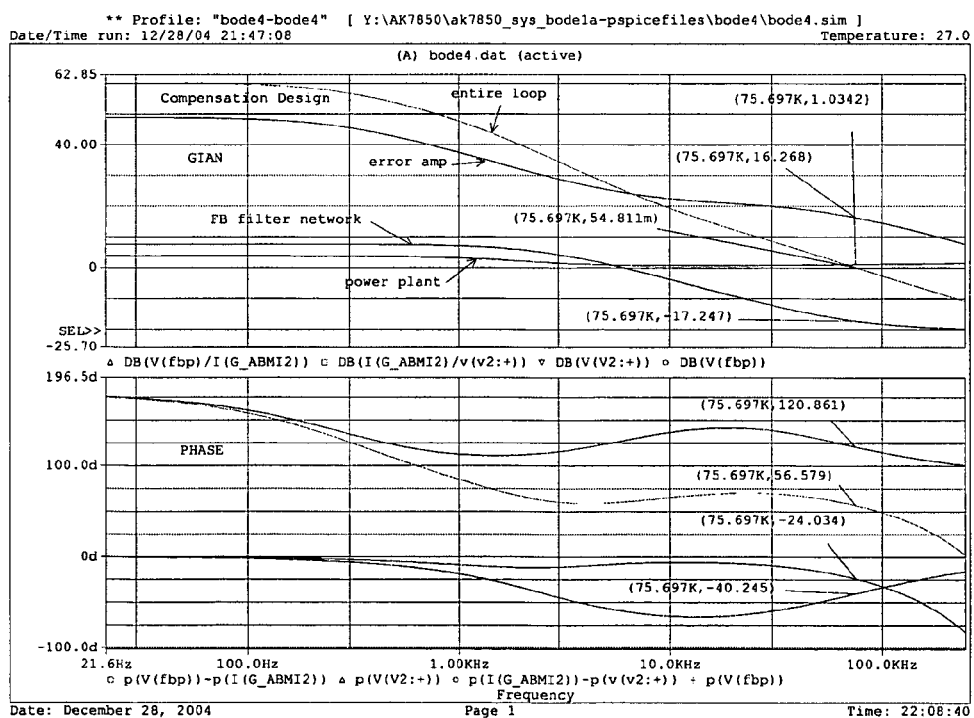
FIG._26

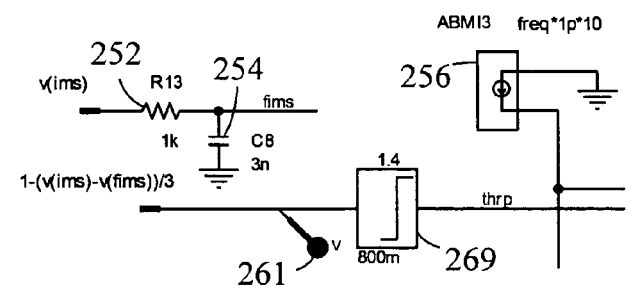
FIG._22
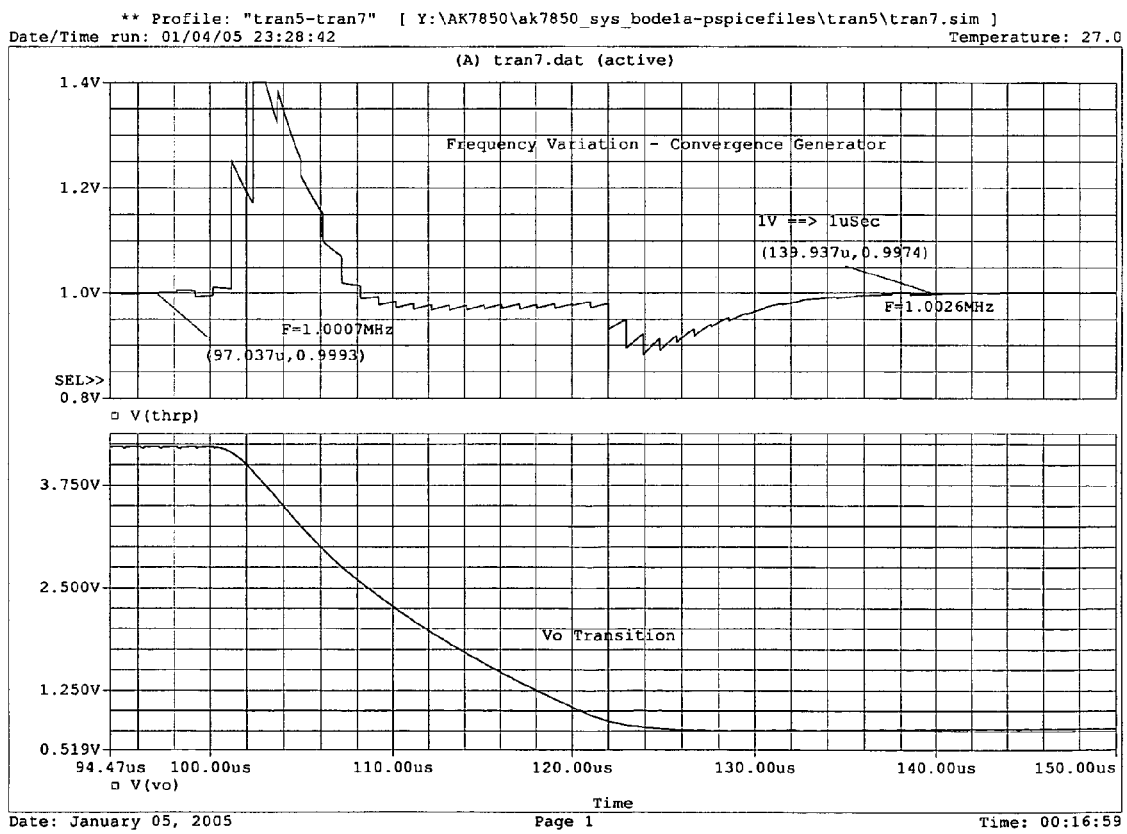
FIG._23

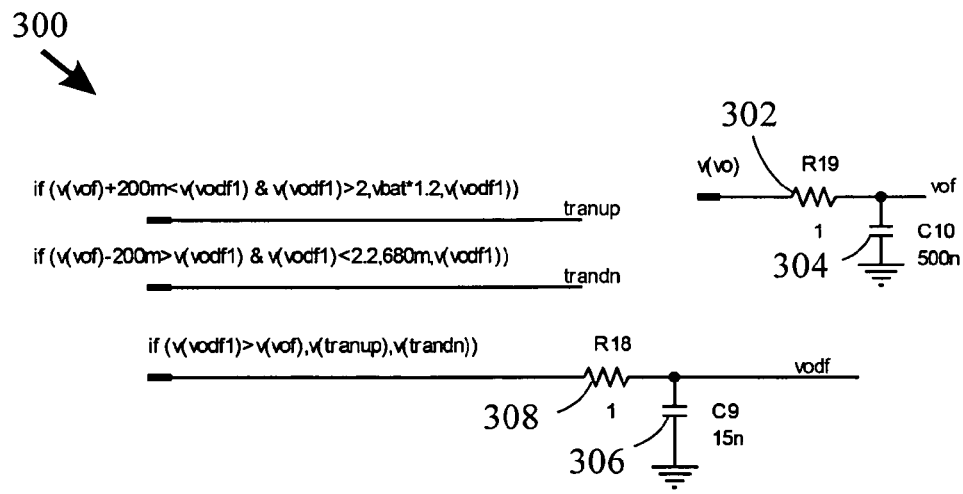
FIG._24
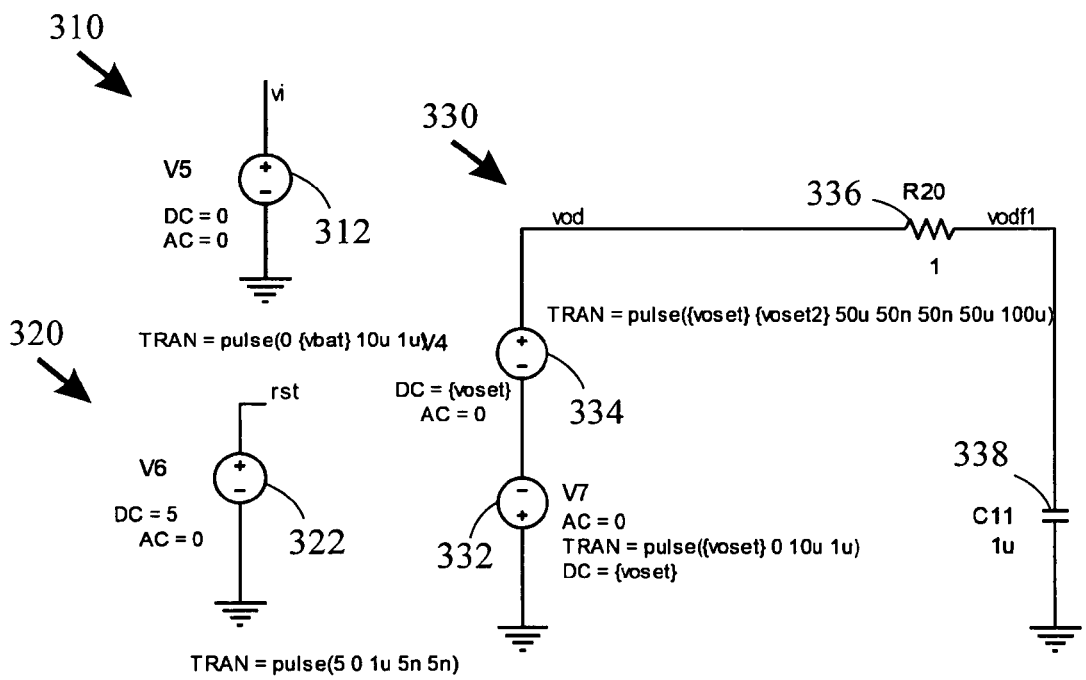
FIG._25

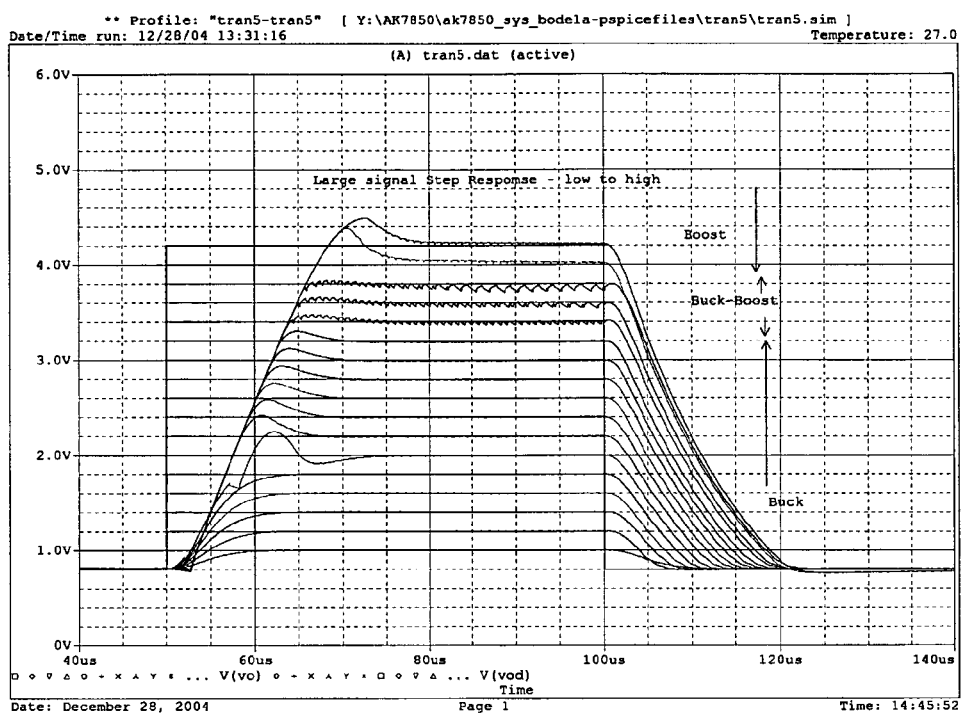
FIG._27
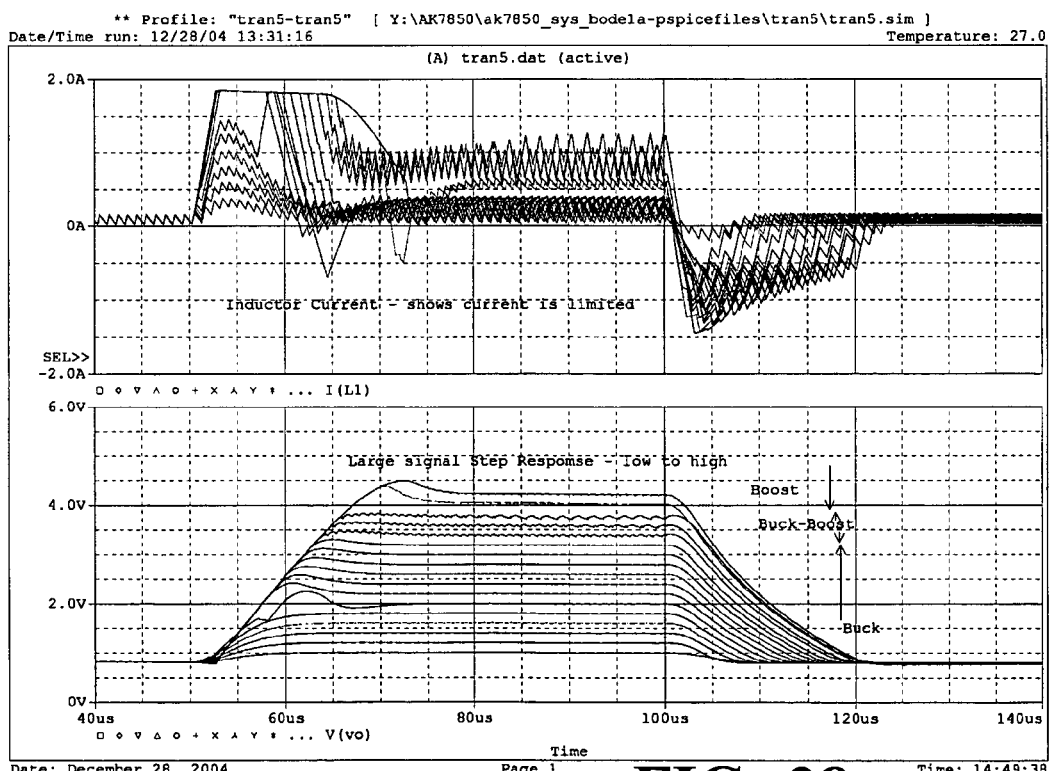
FIG._28

FIG._35

POWER CONVERTER USING EXTRAPOLATIVE CONDUCTANCE MODE CONTROL

FIELD OF THE INVENTION

The present invention relates to power converters, including those used in inductor-based switched-mode power supplies.

DESCRIPTION OF THE RELATED ART

Power converters are commonly used to convert raw electrical input power to a controlled or stabilized voltage and/or current to meet the requirements of a specified load. In simplified terms, a power converter may be placed between an otherwise incompatible source and load to make the source and load compatible with one another. Switched-mode power converters offer the benefit of high efficiency by employing low loss components (such as capacitors, inductors, and transformers) and switches that are switchable between two states (i.e., on and off). Conventionally, a switched-mode power converter is stabilized by monitoring variables such as output voltage and/or inductor current, with these measurements being used to govern the duty cycle of the switching process.

Common control modes for switched-mode power converters include voltage-mode control and current-mode control. Both of these control modes utilize an output voltage signal, while current mode further utilizes inductor current monitoring. Voltage-mode control employs a single control loop in which the pulse width modulator compares the output voltage error signal against a fixed ramp (which may be proportional to the input voltage, but nonetheless has a fixed slope) to modulate the duty cycle. Voltage-mode control offers reduced noise susceptibility and allows a wide range for the pulse width modulation duty-cycle ratio; however, it can suffer from slow response to large dynamic loads, and also suffers from the need for second order (LRC or inductor-resistor-capacitor) output filters—leading to 180 degrees of phase margin.

Current-mode control improves on the inherently slow response of simple voltage-mode controllers by employing two control loops: a fast, inner current control loop, and an outer voltage control loop. The inner control loop, which utilizes a current sense resistor to continuously monitor inductor current, sets the (e.g., peak) inductor current for each switching cycle. The current in a switched mode power supply utilizing current mode control is switched between a peak and a minimum current value. A control block diagram for a conventional current-mode controller is provided in FIG. 1. The current control loop 12 is contained within a conductance mode power converter 10, which uses a demand signal and a voltage to produce a regulated current. The outer voltage control loop 20 provides voltage regulation utility, with the output 25 of the outer loop serving as the demand signal for the inner control loop 12, thereby defining the level at which the inner loop 12 regulates inductor current through the switch 14. The outer loop 20 may include a compensation element 21 and a filtering element 22. A primary advantage of current mode control over voltage mode control is that it permits the inductor to be eliminated from the output filter, thus simplifying the output filter from a second order (LCR) system to a single order (RC or resistor-capacitor) system. A single order response characteristic is desirable because it has only 90 degrees of phase margin, which simplifies the design of the error amplifier and compensation network of the associated power electronics.

Two fundamental limitations, however, have hindered the widespread adoption of current mode control. First, conventional current mode control requires the inductor current to be monitored (i.e., with a current sense resistor) and compared to a threshold value to terminate each charge cycle. This requirement presents the designer with a difficult trade-off between achieving high signal-to-noise ratio of the monitored signal, and minimizing the power loss necessary to achieve the measurement. The use of a high resistance current sense resistor favors the attainment of a high signal-to-noise ratio but leads to unacceptably high power losses, while the use of a low resistance resistor enables efficient operation but sacrifices signal-to-noise ratio. Second, conventional current mode control in restricted by a 50% duty cycle limitation, with duty cycles greater than 50% causing sub-harmonic oscillations that lead to circuit instability. Such instability may be mitigated with the use of a fixed slope ramp signal in a technique called slope correction, wherein the current mode controller is migrated toward voltage mode operation for duty cycles greater than 50%. When slope correction is employed, however, the benefits of the first order output filter characteristic is lost because the fixed slope ramp signal utilized in slope correction creates a second order LCR output filter characteristic inherent to voltage mode control.

In consequence, the art continues to seek improvement in power converters. It would be desirable to provide a power converter having a high signal-to-noise ratio and low power loss characteristics. It would also be desirable to provide a power converter capable of operation at a duty cycle of greater than 50% and remain stable without requiring slope correction for stable operation.

SUMMARY OF THE INVENTION

The present invention relates to power converters employing a novel form of control termed "extrapolative conductance mode" or "ECM." An ECM converter bears some similarity to a conductance mode power converter embodying the inner loop of a conventional current mode power converter, but with certain critical distinctions. First, ECM control dispenses with the need for continuous current monitoring. Instead, current is only sampled periodically (preferably at the beginning of each charge cycle) and stored. Second, ECM control utilizes the sampled current value to extrapolate the charge pulse duration, with this duration set to be proportional to the difference between the desired (e.g., peak) current and the current monitor sample. Extrapolating charge pulse duration is distinct from the conventional method of terminating the charge duration upon attainment of a specified condition. Third, in preferred embodiments directed to applications where it is desirable to operate at duty cycles of 50% or greater, the 50% duty cycle limitation inherent to current mode control is overcome without the use of a fixed slope ramp signal (i.e., slope correction). Instead, the operating frequency of the converter is shifted or skewed when the current sampler is perturbed (e.g., due to switching or intrinsic noise sources), with the changing frequency characteristic resulting in convergence or dissipation of sub-harmonic oscillations. Such convergence may be obtained with the use of a convergence generator as described herein. While highly preferable, this functionality may be omitted from an ECM power converter intended for operation with duty cycles below 50%. Utilizing ECM control with the foregoing features, a first order output filter response may be obtained without a 50% duty cycle limitation, and without the need to compromise current monitor signal-to-noise ratio to achieve acceptably low power loss levels.

In one aspect, the invention relates to an extrapolative conductance mode power converter including a convergence generator adapted to alter the discharge duration, wherein the sum of the charge duration and the discharge duration is permitted to vary when the power converter is in a non-steady state.

In another aspect, the invention relates to an extrapolative conductance mode power converter having an output that is regulated without monitoring peak current.

In another aspect, the invention relates to an extrapolative conductance mode power converter having an output that is regulated without continuous current monitoring during the charge cycle.

In another aspect, the invention relates to an extrapolative conductance mode power converter having a charge duration that is established by a demand signal and at least one current sample.

In another aspect, the invention relates to an extrapolative conductance mode power converter having a charge duration and an inductor current subject to vary relative to a target current, with the charge duration being established prior to the inductor current exceeding the target current.

In another aspect, the invention relates to an extrapolative conductance mode power converter adapted to provide significant gain without causing significant power losses, such that the converter has a peak current threshold of X amperes, a current sense gain of Y volts per ampere, and peak power loss of X2*Y/N, wherein N>1.

Other aspects, features and embodiments of the invention will be more fully apparent from the ensuing disclosure and appended claims.

BRIEF DESCRIPTION OF THE DRAWINGS

In the drawings, like numbers are intended to refer to like elements or structures. None of the drawings are drawn to scale unless indicated otherwise.

FIG. 1 is a control block diagram for a conventional current-mode controller.

FIG. 2 is a control block diagram for an extrapolative conductance mode power converter according to a first embodiment of the present invention.

FIG. 4 is a schematic illustration of an electronic device or system utilizing an extrapolative conductance mode power converter.

FIG. 5 is a schematic illustration of an electronic device or system utilizing a switched mode power supply including an extrapolative conductance mode power converter.

FIG. 6 is a listing of seven example parameter values used by a DC-DC switched mode power supply including an ECM power converter according to a second embodiment, as further illustrated in connection with the following FIGS. 7-37.

FIG. 7 is a PSPICE Analog Hardware Description Language circuit model for simulating a power plant portion (including a voltage to current converter) of a DC-DC switched mode power supply including an ECM power converter according to the second embodiment, with the power plant being adapted to provide power conversion utility in buck, boost, and buck-boost modes.

FIG. 8 depicts PSPICE simulation results including time-dependent plots or waveforms for four parameters of the modeled power plant portion of FIG. 7 operated in buck mode, the four parameters being current I(L1) and voltages V(bucklin), V(lin), and V(lx).

FIG. 9 depicts PSPICE simulation results including time-dependent plots or waveforms for four parameters of the power plant portion of FIG. 7 operated in boost mode, the four parameters being current I(L1) and voltages V(boostlx), V(lin), and V(lx).

FIG. 12 is a PSPICE Analog Hardware Description Language circuit model for the discharge switch subcircuit of the voltage feedback portion illustrated in FIG. 11.

FIG. 13 depicts PSPICE simulation results including time-dependent plots or waveforms for three parameters of the discharge switch subcircuit of FIG. 12, the three parameters being currents I(ABMI2) and I(L1), and voltage V(v0).

FIG. 14 is a PSPICE Analog Hardware Description Language circuit model for the compensation network subcircuit of the output filter capacitor, load resistor, and voltage feedback portion illustrated in FIG. 11.

FIG. 15 depicts PSPICE simulation results including a Bode plot showing the frequency response of the compensation network subcircuit of FIG. 14.

FIG. 16 is a PSPICE Analog Hardware Description Language circuit model for the error amplifier U9 illustrated in FIG. 11.

FIG. 17 depicts a Bode plot showing the frequency response of the error amplifier of FIG. 16.

FIG. 18 is a PSPICE Analog Hardware Description Language circuit model for a current sampler portion of a DC-DC switched mode power supply including an ECM power converter according to the second embodiment.

FIG. 19 depicts PSPICE simulation results including time-dependent plots or waveforms for three parameters of the circuit sampler portion of FIG. 18, with the upper window depicting current I(L1) and voltage V(ims) and the lower window depicting voltage V(rstr).

FIG. 21 depicts PSPICE simulation results including time-dependent plots or waveforms for several parameters of the charge duration extrapolation portion of FIG. 20, the parameters including voltage V(dn) and current I(L1) in the upper window; voltages V(ims) and V(ip) in the middle window; and voltage V(thrch) and V(thrp) and V(ramp) in the bottom window.

FIG. 22 is a PSPICE Analog Hardware Description Language circuit model for a convergence generator portion of a DC-DC switched mode power supply including an ECM power converter according to the second embodiment.

FIG. 23 depicts PSPICE simulation results including time-dependent plots or waveforms for two parameters of the convergence generator portion of FIG. 22, including voltage V(thrp) in the upper window and voltage (vo) in the lower window.

FIG. 24 is a PSPICE Analog Hardware Description Language circuit model for transitional mode circuit portions of a DC-DC switched mode power supply including an ECM power converter according to the second embodiment.

FIG. 25 is a PSPICE Analog Hardware Description Language circuit model for input test vector circuit portions of a DC-DC switched mode power supply including an ECM power converter according to the second embodiment.

FIG. 26 depicts PSPICE simulation results including two Bode plots showing the open loop frequency response of a DC-DC switched mode power supply including an ECM power converter according to the second embodiment.

FIG. 27 depicts PSPICE simulation results including a plot of large signal step transient response (low to high) for voltages V(vo) and V(vod) of a DC-DC switched mode power supply including an ECM power converter according to the second embodiment.

FIG. 28 depicts PSPICE simulation results including a plot of inductor current I(L1) transient response in the upper window, and a corresponding plot of large signal step response (low to high) for voltage V(vo) of a DC-DC switched mode power supply including an ECM power converter according to the second embodiment.

DETAILED DESCRIPTION OF THE INVENTION, AND PREFERRED EMBODIMENTS THEREOF

Definitions

Figure 3A:
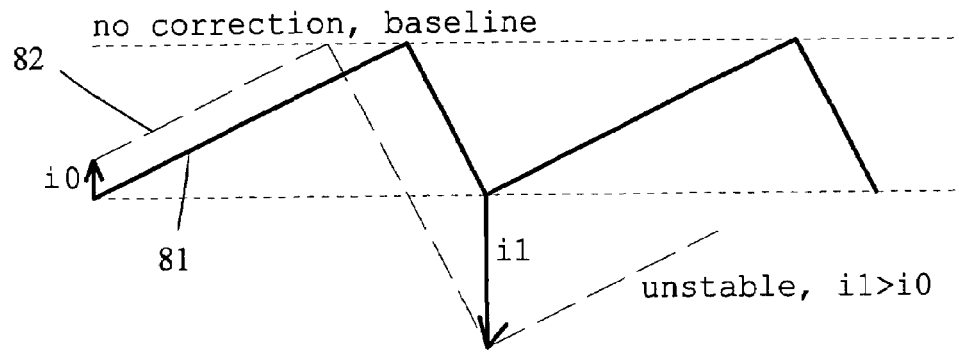
FIG. 3A is a demonstrative plot of current versus time for an inductor of a conventional current mode power converter operating at a duty cycle of 50% or greater, with the power converter lacking slope correction, showing the effect of sub-harmonic oscillations in causing measured current to diverge from its target value.

The terms "charge cycle" and "charging mode" as used herein refer to a period during which a flow of electric current/energy is supplied to a charge storage element (e.g., a capacitor) or a magnetic flux energy storage element (e.g., an inductor or transformer). The duration of the charge cycle or charging mode may be called the charge pulse duration or charge duration.

The term "conductance mode power converter" refers to a power converter that uses a demand signal and a voltage to produce a regulated current.

The terms "current mode" as used herein refers to a control method for a switched-mode power converter that utilizes a first loop that sets the desired inductor current for each switching cycle, and a second control loop that varies the inductor current on a cycle-by-cycle basis to output a regulated voltage despite variations in load-current and input-voltage.

The terms "discharge cycle" and "discharge mode" as used herein refer to a period during which a flow of electric current/energy is received from a charge storage element (e.g., a capacitor) or a magnetic flux energy storage element (e.g., an inductor or transformer). The duration of the discharge cycle or discharging mode may be called the discharge duration.

The term "duty cycle" as used herein refers to the ratio of charge duration to the sum of (charge duration plus discharge duration) for continuous current mode operation. In discontinuous current mode operation there exists an off period, making the duty cycle equal to the ratio of the charge duration to the sum of (charge duration plus discharge duration plus off duration), or the ratio of the charge duration to the period (1/F) of the converter.

The term "extrapolative conductance mode power converter" as used herein refers to a conductance mode power converter that employs periodic (i.e., discontinuous) current sampling and utilizes the periodically sampled current to extrapolate charge pulse duration. Preferred ECM power converters adapted to permit stable operation at duty cycles of 50% or greater optionally include convergence generation capability to alter the operating frequency of the converter in response to current sample perturbations to dissipate subharmonic oscillations without the use of slope correction.

The term "power converter" as used herein refers to a device or circuit used to convert raw electrical input power to a controlled or stabilized voltage and/or current to meet the requirements of a specified load.

Introduction to Extrapolative Conductance Mode Control

Extrapolative conductance mode control as described herein is intended primarily for use in power converters. The resulting ECM power converters may be utilized with or without associated voltage control elements. In one application, an ECM power converter may be used as a current source, such as may be useful within a laser or LED driver where the output of the laser or LED is proportional to current but not voltage. In another application, an ECM power converter may be utilized within a switched-mode power supply providing voltage regulation utility, with the resulting switched-mode power supply being suitable for use in myriad different types of electronic devices and systems. In another application, an ECM power converter may be used in a power factor correction device or network. One skilled in the art will recognize that ECM power converters as described herein may be combined with various electronic elements and/or utilized in various electronic systems for additional advantage.

A control block diagram for an ECM power converter 50 according to one embodiment is provided in FIG. 2. An input voltage Vin is provided to a power plant 52 (which includes a magnetic flux energy storage element 54 such as an inductor or transformer; current switches 56; and a charge storage element 58 such as a capacitor, and a regulated output voltage Vout is provided by the power plant 52. The output voltage is also supplied to a subcircuit 60 including a voltage control element 62 and a frequency compensation element 64, with the output signal ip from the subcircuit 60 being supplied to a duty cycle extrapolator 70 having a convergence generator 72. The duty cycle extrapolator 70 further receives a current signal ims from a current sampler 66, which itself receives a discretely sampled current signal iL from the power plant 52. The duty cycle extrapolator 70 provides an output signal D to the power plant 52.

The extrapolative conductance mode control approach uses discrete current sampling rather than continuous current monitoring required by conventional conductance mode control power converters. For each cycle, the current level is sampled at least once and stored in a sample and hold circuit (e.g., within a current sampler 66 such as illustrated in FIG. 2); in a preferred embodiment, the sampled current is stored as an analog voltage. The current sampling period is preferably less than about 50% of the charge duration; more preferably less than about 10% of the charge duration; more preferably less than about 2% of the charge duration; and still more preferably less than about 1% of the charge duration. In terms of absolute time, desirable current sampling periods may be on the order of 1 nanosecond to 10 or possibly 20 nanoseconds. Preferably, a single substantially instantaneous current sample is taken at high power levels to provide a high current sample signal-to-noise ratio because the short sampling time permits high resistance elements to be used for sensing inductor current. Such a sample is preferably taken at the beginning of each charge cycle (when inductor current is at it minimum value), although a sample taken at the end of each discharge cycle is equivalent. With the use of an instantaneous sample, the average power per cycle is negligible. Additionally, because the inductor current is not continuously monitored, the monitor resistance can be high without sacrificing the efficiency of the converter. Low resistance switches are preferably used to further promote efficient operation.

The ability to provide both high efficiency (i.e., low power loss) and high gain/high signal-to-noise ratio is a key advantage of the present invention compared to conventional conductance mode power converters. In one embodiment, an ECM power converter has a peak current threshold of X amperes, a current sense gain of Y volts per ampere, a peak power loss of $X^2*Y$, and an average power loss of $X^2*Y/N$, wherein N>1. Conventional conductance mode power converters utilizing continuous charge current monitoring are unable to fulfill this requirement—instead being limited to $N \leq 1/D$ because the current is monitored throughout the entire charge cycle.

After current has been sampled, the charge duration needed to achieve the desired current (e.g., peak current) is extrapolated using the stored current sample. The charge pulse duration is set to be proportional to the difference between the desired peak current and the current monitor sample. Charge duration extrapolation preferably utilizes a ramp generator. A first threshold may be used to determine charge pulse duration, and a second threshold may be used to determine the operating frequency of the regulator. The charge duration threshold may be compared to a voltage ramp to generate a charge pulse of the required duration to achieve the desired (e.g., peak) demand current, with the demand current being used to maintain voltage regulation at the output by the voltage control loop. The gain term relating the change in the inductor current to the pulse duration may be determined based on signal scaling and the voltage control loop gain needed for a given application. Any of a fixed, nonlinear, and/or piece-wise linear scaling may be used. Once the charge cycle duration is determined, a charge cycle is initiated which will terminate at the specific time required to reach the desired current level.

For an ECM power converter used in conjunction with an external voltage control loop (e.g., within a switched-mode power supply), the calculation of charge pulse duration only has to maintain a proportionality relationship to the change in current that is required (the peak current requested minus the last current sample taken) since the peak current level is set by a high gain voltage control loop (the external loop). Since the current in a conventional switched mode power supply is switched between a peak and a minimum current value, the discussion herein of extrapolative conductance mode control is directed primarily to control based on peak current for illustrative purposes. However, it is specifically contemplated that the extrapolative conductance mode control may be used to control average or even minimum current in appropriate circumstances.

In preferred embodiments, the 50% duty cycle limitation is overcome by a novel lead term that skews that operating frequency of the converter when the current sampler is perturbed, such as due to switching or intrinsic noise sources. Frequency is inversely proportional to the sum of the charge period and discharge period; preferably, the discharge period is varied to achieve convergence. A circuit adapted to achieve convergence by altering the operating frequency (e.g., by altering the discharge period) without utilizing slope correction may be called a "convergence generator." Any perturbation such as noise may cause the sampled current to change from one charge cycle to the next. For duty cycles greater than 50%, the natural tendency of the current in a power converter having current mode control characteristics is to diverge from the desired value due to sub-harmonic oscillation. Convergence is achieved by increasing the switching frequency (i.e., shortening the discharge period) whenever the sampled current experiences an abrupt increase, and by decreasing the switching frequency (i.e., lengthening the discharge period) whenever the sampled current experiences an abrupt decrease. This is degenerative feedback because it prevents the sampled current from further divergence in successive cycles. The changing frequency characteristic results in convergence for duty cycles greater than 50%. Furthermore, the time constant of the frequency shifter can be very low— preferably under 5 microseconds for a power converter operating at 1 MHz, for example.

Figure 3B:
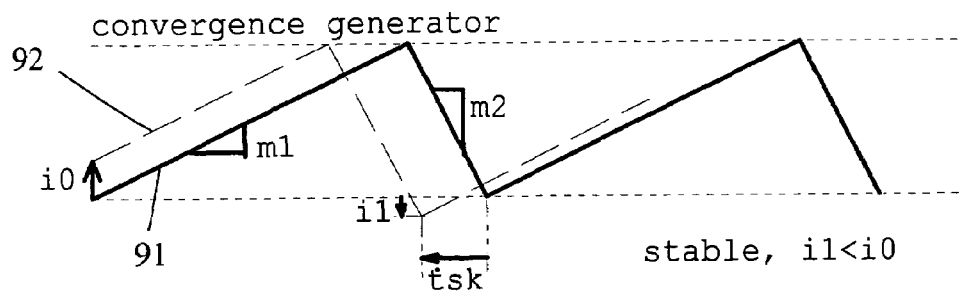
FIG. 3B is a demonstrative plot of current versus time for an inductor of an extrapolative conductance mode power converter operating at a duty cycle of 50% or greater and employing a convergence generator, showing the effect of frequency skewing in dissipating sub-harmonic oscillations and causing measured current to converge toward its target value.
Figure 10:
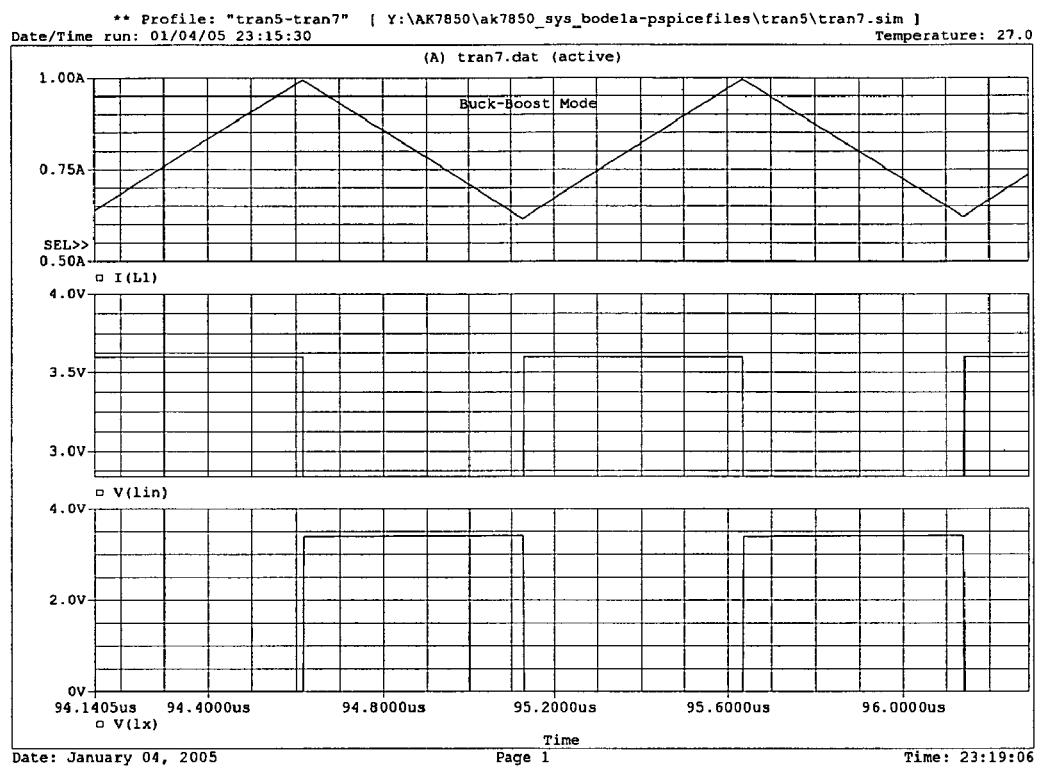
FIG. 10 depicts PSPICE simulation results including time-dependent plots or waveforms for three parameters of the power plant portion of FIG. 7 operated in buck-boost mode, the three parameters being current I(L1) and voltages V(lin), and V(lx).

The negative effects of sub-harmonic oscillations and the effect of frequency skewing are shown in FIGS. 3A-3B. FIG. 3A is a demonstrative plot of current versus time for an inductor of a conventional current mode power converter operating at a duty cycle of 50% or greater, with the power converter lacking slope correction. The rising and falling solid line 81 represents target current, while the rising and falling dashed line 82 represents actual current for a system given a perturbation of i0. The upper and lower horizontal dashed lines represent desired minimum and maximum currents, respectively. At the initial state (i.e., starting at left), noise or any other perturbation causes an abrupt increase in actual current, causing the actual current to exceed the target current by a value represented by the arrow labeled i0. When the target current reaches the desired maximum current (upper horizontal line), the discharge cycle is initiated. Since the inductor of FIG. 3A operates at a fixed frequency, however, target current dips below the minimum current (lower horizontal line) during the discharge cycle such that when the next charge cycle is initiated the difference between the actual current and the target current is represented by the arrow labeled i1. Since i1 is greater than i0 (i.e., the difference between the actual current and the target current is increasing with each charge cycle), the system is unstable.

FIG. 3B is a demonstrative plot of current versus time for an inductor of an extrapolative conductance mode power converter operating at a duty cycle of 50% or greater and employing a convergence generator. As before, the rising and falling solid line 91 represents target current, the rising and falling dashed line 92 represents actual current, and the upper and lower horizontal dashed lines represent desired maximum and minimum currents, respectively. At the initial state (i.e., starting at left), a perturbation causes the actual current to exceed the target current by a value represented by the arrow labeled i0. In contrast to the system of FIG. 3A, the inductor of FIG. 3B is permitted to operate at a variable frequency. Thus, while the slopes of the actual current during each of the charge and discharge cycles is substantially equal to the slopes of the target current m1 and m2, respectively, varying the discharge duration (leading to variation in both duty cycle and operating frequency) causes the difference in actual minimum current versus target minimum current (represented by the arrow labeled i1) to be smaller than the initial current perturbation i0, leading to convergent or stable system operation (i.e., where i1<i0). The skewing time tsk, which is equal to the difference between (the sum of the actual charge period and the actual discharge period for one cycle) and (the sum of the target charge period and the target discharge period for one cycle), is greater than i0*(1/m1−1/m2), less than i0*(1/m1+1/m2), and equals i0/m1 for one cycle correction as D approaches 1.

Greater detail regarding an ECM power converter embodied within a DC-DC switched mode power supply according to preferred embodiment are provided below in Example 1.

There exist numerous uses for ECM power converters, and such converters may be included in a variety of devices and associated systems. Referring to FIG. 4, an electronic system 100 includes a device 102 having an ECM power converter 101. A power source 106 is in electrical communication with the device 102 and power converter 101, a suitable fixture 104 supplies an input signal to the power converter 101, and the output of the power converter 101 drives a load 108.

In one embodiment, the system 100 is an electronic system 100, with the device 102 being an integrated circuit 102 including an ECM power converter 101. The integrated circuit 101 may any circuit having at least two interconnected semiconductor devices.

In another embodiment, the system 100 is a laser system 100, with the device 102 being a laser driver 102 and the load 108 including a laser 108. In a substantially similar embodiment, the system 100 is a light emitting diode (LED) system 100, with the device 102 being an LED driver 102 and the load 108 including at least one LED 108. In either instance the ECM power converter 101 may operate as a current source without the need for an external voltage loop, because neither a laser nor a LED require tightly regulated voltages. Instead, the outputs of such components are directly proportional to current.

In another embodiment, the system 100 is a battery charging system 100 with the device 102 being a battery charging regulator or device 102. In such an instance, the ECM power converter 101 preferably includes an associated voltage control loop.

In another embodiment, the system 100 is a power factor correction system 100 for counteracting the effects of load capacitance or inductances that would otherwise lead to an undesirable power factor. The device 102 utilizing the ECM power converter 101 is a power factor correction device 102 used to reduce the transfer of reactive power from the power source 106 to the load 108. With such a device 102, the fixture 104 may be optionally provided, or may be embodied in a sensor to provide a control and/or feedback signal to the device 102.

In various embodiments, ECM power converters may provide AC-DC conversion utility or DC-DC conversion utility.

In another embodiment illustrated in FIG. 5, an electronic system or device 110 includes a switched mode power supply 112 incorporating an ECM power converter 111. The device 110 preferably includes a power source 116 and a fixture 114 for inputting a signal to the power supply 112, with any one or more of the power supply 112, power source 116, fixture 114, and load element 118 being disposed in or on an appropriate housing or support element 113. The power supply 112 receives an input signal from the fixture 114, and, with the aid of the ECM power converter 111, generates an output signal that drives a load 118. Examples of electronic devices according to this embodiment include power amplifiers, broadcast transmitters, audio amplifiers, personal computers, and wireless communication devices such as mobile telephones and personal data assistants.

The advantages and features of the invention are further illustrated with reference to the following Example, which is not to be construed as limiting the scope of the invention but rather as illustrative of various embodiments of the invention in specific applications thereof.

Example 1

A system model for a switched-mode DC-DC power supply including an ECM power converter (the model including numerous circuit functions, along with related waveforms and frequency response plots) is illustrated in FIGS. 7-37, with corresponding descriptions of the circuit operation for various function provided below. This particular embodiment is intended for use in a DC-DC switched mode power supply (i.e., including an associated voltage loop) adapted for buck, boost, and buck-boost operation; however, the structures and concepts disclosed herein will be readily extendible to other embodiments by those skilled in the art with the benefit of the present disclosure.

FIGS. 7-37 were generated using Cadence PSPICE version 10.3.0 software (Cadence Design Systems, San Jose, Calif.). PSPICE (a variant of the "Simulation Program with Integrated Circuit Emphasis" or "SPICE" program developed by the EECS Department at the University of California, Berkeley) is a commercially available simulation software package used by designers to design circuits and related systems, and to simulate their operation to estimate their performance prior to physically implementing such designs actual circuits and systems. Thus, the diagrams and various elements depicted in FIGS. 7-37 are not necessarily intended to depict actual circuits and circuit elements, but rather to provide a working model of circuit functions appropriate to communicate system architecture to a circuit designer. With the benefit of the text herein and the appended figures, one skilled in the art will be readily able to translate and implement the disclosed concepts in physical circuits, devices, and/or systems as appropriate for a given end use.

A. Power plant

The power plant portion of a conductance mode controller (whether or not contained within an ECM controller according to the present invention) includes a voltage to current converter. One example of such a power plant portion 150 is provided in FIG. 7, with associated parameters applicable to FIGS. 7-37 provided in FIG. 6. The power plant portion 150 includes an inductor L1 154 and its associated equivalent series resistance R6 152, a current to voltage converter block H1 158, a (PSPICE) current limit voltage-voltage converter E1 156 (i.e., to oppose increases in current beyond a defined threshold), and five conditional statement blocks. These elements in combination emulate the switches in a buck-boost power supply. This system model is capable of power conversion in buck mode, boost mode, and buck-boost (or "BB") mode (for Vo near Vin) that uses a boost charge cycle followed by a buck discharge (or transfer) cycle. The output of the current to voltage converter block H1 158 is isen, which is an alias of the inductor current iL. While the model of FIG. 7 suggests that the current of the inductor L1 154 is continuously monitored, an actual implementation, switched components such as transistors are used to provide discrete sampling of inductor current. A non-essential current probe 155 is included in the model of the power plant portion 150.

The first model term is called bucklin, which is the input side of the inductor when operating in buck mode (see FIG. 8). The bucklin term is set to vi (alias vbat) when the duty cycle asserts the charge cycle (dn logic 1). The bucklin term is set to zero volts when dn is less than 0.5V (logic zero). This model does not include switching losses. Once a switch is is designed for a given application, an estimated inductor resistance R6 152 may be added in series with the inductor L1 154, or actual switches can be used with combinational logic to replace the higher level model.

The next term is called the input side of the inductor in all modes (lin). If the demand value for the output (vod) is greater than the voltage source supplying the converter (vbat) times 1.1, and if the peak current requested (ip) is greater than zero, then lin is set to equal vi. This is the correct termination voltage for the input side of the inductor for boost mode operation. The condition that ip must be greater than zero or lin is connected to ground accelerates the discharge of the inductor L1 154, and improves system response to line and load perturbations. If vod is not greater than vbat*1.1, then the bucklin term is used to drive the input side of the inductor L1 154. This is appropriate for buck as well as BB modes of operation.

The output side of the inductor (lx) is either held at the output voltage (vo) for buck mode, or switched between vo and ground for boost and BB modes of operations (see FIG. 9). The term boostlx is used for boost and BB modes and is zero if dn is logic high, or set to vo if dn is logic low. This represents the operation of the switches in boost mode and BB mode (see FIG. 10).

If vod is less than vbat*0.9 then lx is set to vo (buck mode configuration). If vod is not less than vbat, then the boostlx term is used (boost and BB modes). These simple conditional statements and circuit elements model the operation of the power plant 150 in three modes of operation. Buck mode is employed if vod is less than vbat*0.9, BB mode is employed if vod is greater than vbat*0.9 and less than vbat*1.1, and boost mode is employed if vod is greater than vbat*1.1. Depending on the load characteristics and the power switches used, the upper and lower limits to the BB mode region can be increased or decreased to obtain optimal performance. The switching action in these three modes of operation converts the duty cycle (dn in steady state) to a peak inductor current. Depending on the inductor value, vbat and vo level, and the frequency of operation, the ripple current and thus average inductor current is controlled. As noted previously, the power plant model also has a current limit feature as implemented in the voltage-voltage converter E1 156. If isen>ilim, then E1 provides a voltage to oppose any further increase in the inductor current.

B. Discharge switch

Referring to FIG. 12, a discharge switch subcircuit 160 is modeled by the combination of a (PSPICE) equation-to-current Analog Behavioral Model block ABMI2 162, the term boostxi, and a resistor R4 164, with the resistance value of the resistor R4 164 serving as an estimate of the resistance of a discharge switch (e.g,. a MOSFET). Boostxi is used for BB and boost mode (see FIG. 8). The source block ABMI2 162 is set to 0A if dn is logic high (charge cycle) or to isen if dn is logic low (discharge cycle). If the filtered vo demand signal (vodf) is less than vbat*0.9, then the current is set to isen for both the charge and discharge cycles (buck mode). Otherwise it is set to boostxi (BB and boost mode). The discharge current is directed to the output through the switch resistance R4 164. A small fraction of the isen current goes though a resistance R14 173 (shown in FIG. 14) to drive the compensation network 161.

Waveforms showing transfer current I(ABMI2), inductor current I(L1), and output filter cap voltage V(v0) associated with the discharge switch subcircuit 160 are shown in the three panels of FIG. 13, with each panel being linked in time. Each waveform includes temporal portions in buck mode (between approximately 36 and 50 microseconds), transition mode (between approximately 50 and 75 microseconds), and boost mode (starting at approximately 75 microseconds). During both buck and boost modes (at left and right, respectively, of all three panels illustrated in FIG. 13), the inductor is subjected to switched operation, as is apparent by the sawtooth waveform shapes. During buck mode, all of the inductor current is transferred to the filter cap. During boost mode, only the transfer current is provided to the filter cap, which is why the transfer current periodically goes to zero during the charge cycle. During the transition mode, switching operation is suspended and all of the inductor current is supplied to the filter cap. Switching operation is only resumed in boost mode. The advantage of providing unswitched inductor operation during transition is to permit more rapid transition of Vout to a new value. The bottom panel of FIG. 13 shows V(v0) making a transition from 0.8 to 4.2 volts within approximately 25 microseconds. Such a rapid transition may be desirable, for example, in a cellular phone transmitter/ antenna power supply to rapidly attain a desired energy value for accurate data transmission and minimum power consumption.

The use of unswitched inductor operation during transition enables substantially shorter transition time than could be obtained by an immediate transition from buck mode to boost mode. Conditional statements enabling unswitched inductor operation during the transition are provided in connection with FIG. 24.

C. Compensation Network

Referring to FIG. 14, the compensation network 160 includes an output filter (inclusive of load resistor R2 166 and capacitor C1 168 with its associated equivalent series resistance R3 167), a feedback divider (inclusive of resistor R5 170 and resistor R9 170) and a lead lag network (inclusive of resistors R14 173, R15 176, R4 164, and capacitor C7 174). The output filter characteristic is single order with a pole set by resistor R2 166 and capacitor C1 168. There is a first pole and zero that cancel due to capacitor C7 174 and resistor R14 173, and due to capacitor C1 168, and resistors R3 167 and R4 164, respectively. There is a second pole and zero that cancel due to the equivalent series resistance R3 167 of the filter capacitor C1 168 and its degenerative effect on the lead feedback term generated by the transfer current through the transfer switch (as modeled by resistance R4 164). That leaves a pole at 2.8 KHz due to the filter capacitor C1 168 and the load resistance R2 166, and a zero due to capacitor C7 174 and resistors R14 173 and R15 176. The compensation network 161 improves phase margin near the unity gain crossover of the system (approximately 75 kHz). FIG. 15 provides a plot of the gain and phase characteristics of the compensation network 160.

D. Error Amplifier

Figure 11:
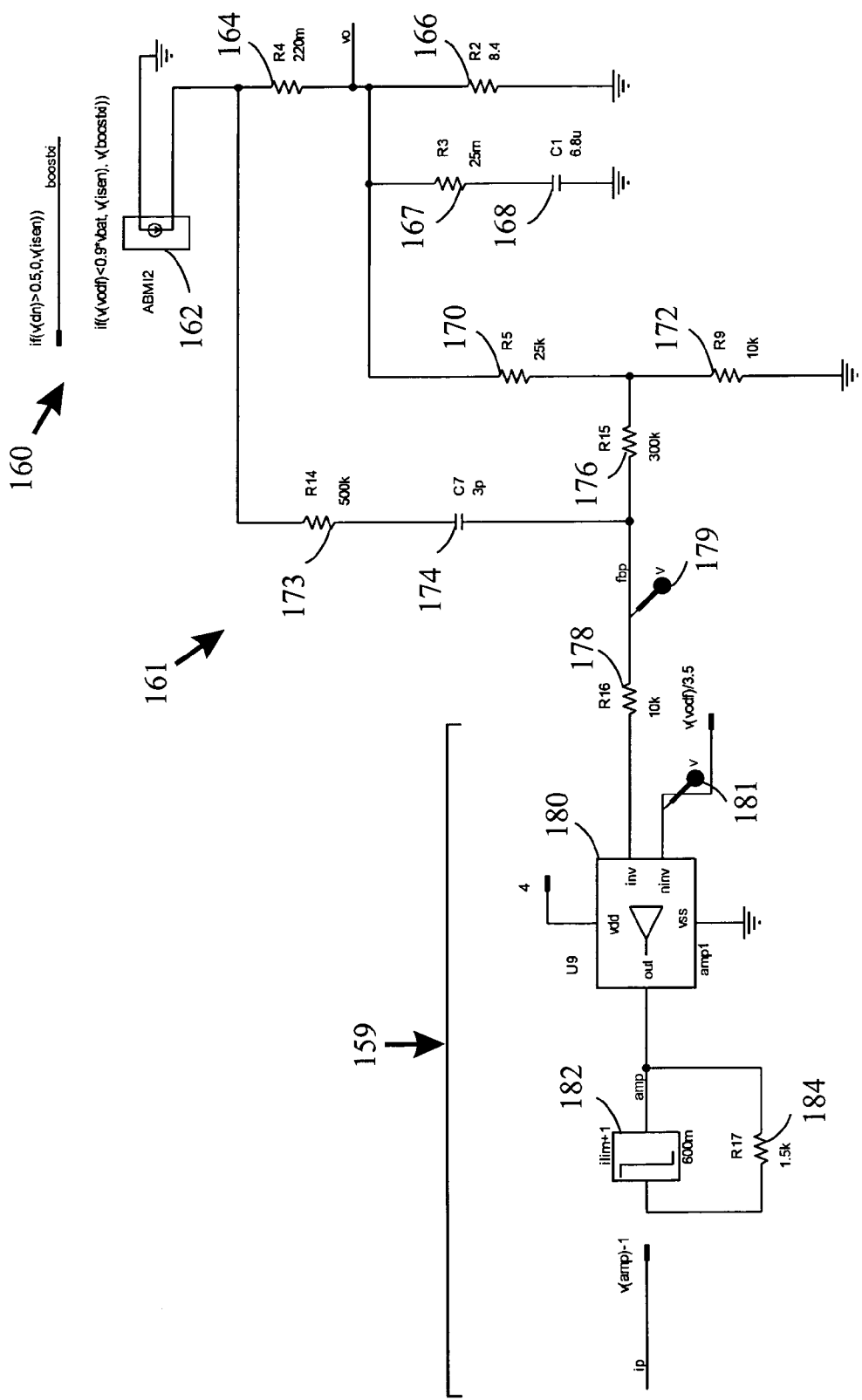
FIG. 11 is a PSPICE Analog Hardware Description Language circuit model for an output filter capacitor, load resistor, and voltage feedback portion of a DC-DC switched mode power supply including an ECM power converter according to the second embodiment, the voltage feedback portion including an error amplifier and discharge switch and compensation subcircuits.

Referring to FIG. 16, a design model is provided for one example of the error amplifier U9 180 illustrated in FIG. 11. The amplifier U9 180 includes a temperature table 220 coupled to a (PSPICE) Analog Behavioral Model voltage-current converter block G1, a voltage source V1 224, and a multitude of PMOS and NMOS (PSPICE) transistor behavioral models including PMOS elements M7 192, M8 194, M9 196, M10 198, M3 202, and M4 204; and NMOS elements M12 212, M11, 214, M6 216, and M5 218. Two capacitors C3 208 and C4 207 and an equivalent series resistance R11 206 are also provided. The gain and phase characteristics (i.e., open loop frequency response) of the error amplifier U9 180 are shown in FIG. 17. The frequency response is designed to provide approximately 90 degrees of phase margin and a unity gain crossover of 600 kHz. The phase response of the error amplifier U9 180 is set to cancel (at least in part) the reduction in the phase margin of the compensation network 161 that occurs at 10 kHz. The phase characteristic and unity gain crossover are critical. However, a higher gain amplifier with a lower frequency dominant pole is possible if high DC gain is needed for a particular application.

The non-inverting input of the error amplifier U9 180 is set to vod/3.5. This provides a demand control for the regulation of vo. Vo will be set equal to vod for steady state operation. The output of the error amplifier U9 180 is clamped such that it will not exceed the current limit (ilim)+1V, or go below 600 mV. The output of the amplifier U9 180 is used to set the peak current demand signal (ip), and is one volt higher than ip. This bias change permits an ip demand range from ilim to −400 mA. The scaling used to achieve this range is arbitrary. The most efficient implementation can be determined at transistor level design. The clamp is important to prevent the miller cap in the error amplifier U9 180 from overcharging, and causing delay when vo comes into regulation.

E. Voltage Feedback

FIG. 11 illustrates output filter capacitor, load resistor, and voltage feedback portions or subcircuits for use with an ECM power converter device according to the present embodiment. FIG. 11 illustrates the voltage feedback portion 159 (which includes the error amplifier U9 180 illustrated in FIG. 16) along with the discharge switch subcircuit 160 shown in FIG. 12 and the compensation subcircuit 161 shown in FIG. 14. The output ip of the voltage feedback subcircuit 159 is shown to the left side of FIG. 11. If desired, the voltage feedback portion 159 can also use an active compensation network with local feedback around the error amplifier U9 180. An optional voltage probe 181 may be in communication with the amplifier U9 180. In addition to the error amplifier 180, the voltage feedback subcircuit 159 includes a resistor R17 184 and a voltage limiter block 182 that limits voltage to control current to a range between 600 ma and the value of (ilim+1).

F. Current Sampler

Referring to FIG. 18, the current sampler 230 includes a control (reset pulse) signal rstr, a switch S1 232, and a holding capacitor C2 236. Characteristic values for the switch S1 232 (namely, voff, von, ron, and roff) are provided in FIG. 18. The signal rstr goes high for approximately 20 ns at the start of each charge cycle, as shown in FIG. 19. During this time, the inductor current is at its minimum value, and is sampled and stored as an analog voltage on capacitor C2 236. The signal isen (represented in both FIG. 7 and FIG. 11) is used as the current monitor sample. This implies a 1-ohm sample resistor, but only for the duration of the sample. A zero voltage drop monitor (H1) is used because the average power loss due to the sample is negligible.

A current sense resistance of one ohm is would be too large for sensing current continuously. However, since a momentary sample is used in the present ECM power converter, the average power loss due to sampling is minimal. For higher noise systems, a larger sense resistance (e.g., 2 or 3 ohms) can be used, or a dynamic sense resistance can be used that increases gain for low current samples.

The sampled current value ims is limited to plus and minus ilim with a (PSPICE) voltage limit block 234 that limits a voltage that is representative of current levels. This can be implemented with a simple switch that diverts the inductor current into the sensing element just long enough to obtain a valid sample. The sample duration can be varied, but a trade-off exists between sample accuracy and peak power due to sampling.

G. Charge Duration Extrapolation

Figure 20:
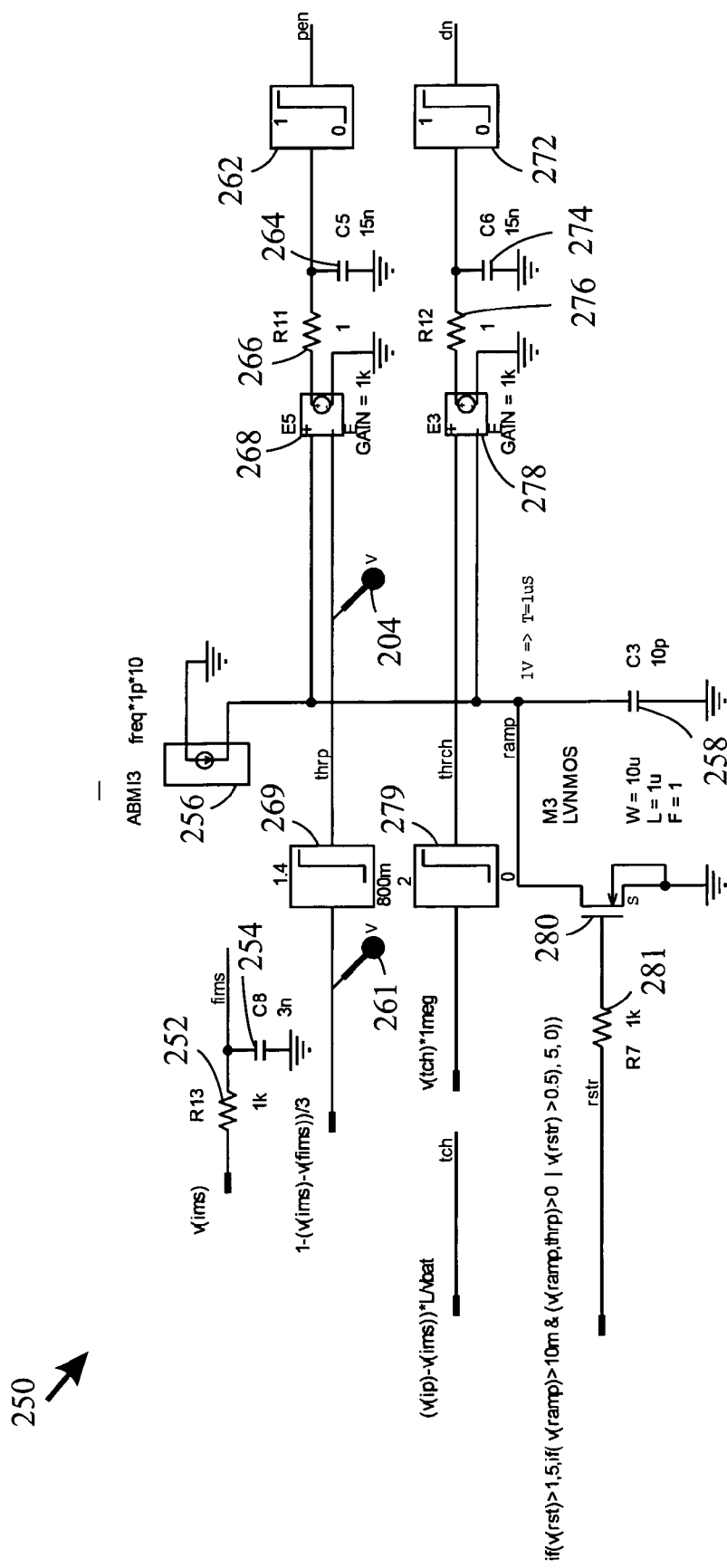
FIG. 20 is a PSPICE Analog Hardware Description Language circuit model for a charge duration extrapolation portion of a DC-DC switched mode power supply including an ECM power converter according to the second embodiment.

Referring to FIG. 20, charge duration extrapolation is accomplished with a DC Analog Behavioral Model expression-to-current block ABMI3 256, a capacitor C3 258, and a transistor M3 280 that form a ramp generator. The transistor M3 280 is off during the charge period, and turns on for a short period (e.g., 20 to 30 nanoseconds) to reset the ramp at the end of the discharge period. The same signal that takes the ims sample controls the operation of the transistor M3. A resistor R7 281 is connected to the transistor M3 280. The term thrp is generated by an expression to voltage term 1-(v(ims)−v(fims))/3 utilized in a (PSPICE) voltage-voltage converter block (with gain) E5 268, which receives an input signal through a current limiter 262 by way of a resistor R11 266 coupled to a grounded capacitor C5 264. The charge duration extrapolation portion 250 further includes voltage limiter (PSPICE) Analog Behavioral Model blocks 269, 279 and optional voltage probes 204, 261. The combination of the block 269, resistor R11 266, capacitor C5 264, and current limiter 262 simulate a comparator. The term thrch, which is a function of tch, is associated with a (PSPICE) voltage-voltage converter block (with gain) E3 278, which receives an input signal through a current limiter 272 by way of a resistor R12 276 coupled to a grounded capacitor C6 274. The current limiter 272, capacitor C6 274, resistor R12 276, and block 278 simulate another comparator. An optional voltage probe 204 is used to monitor the voltage of the thrp node. A portion dedicated to the convergence generator 251 further includes a resistor R13 252 and capacitor C8 254, as also shown in FIG. 22.

Referring to FIG. 21, a first threshold determines the charge pulse width and a second threshold determines the period (or operating frequency) of the ramp generator.

A first step in charge duration extrapolation includes determining the change in current that is required (delta_I). In this embodiment, the change in current is the peak current demand (ip) minus the most recent current sample (ims). The current sample ims can be obtained at the start of the charging cycle, which is equivalent to the end of the last transfer cycle.

Once delta_I is established, it is used to calculate the charge pulse duration. In this embodiment, delta_I is multiplied by the inductor value L divided by vbat. This is the inverse of the BB and boost mode charge slope (dI/dt). It is not necessary to use the buck charge slope (L/(vo-vbat)) if the error amplifier has a high DC gain.

The scaling factor used to relate delta_I to pulse width is equivalent to an added gain in the voltage control loop. Any of linear, nonlinear, or piece-wise linear conversion factors may be used if merited by the overall control loop. The charge duration (Tch), while not necessary in the transistor level implementation, is included in the model solely to better illustrate the extrapolative current mode approach. Tch is multiplied by 1 Meg to scale it to a level that is more appropriate for analog signal processing. The net result is a scaling of 1 volt per μSec at the charge threshold of the ramp generator (thrch). The threshold thrch can be established directly as delta_I*(L*1Meg/vbat). If a scaling of 2 volts per μSec is desired, then a 2 Meg slope term may be used as the proportionality constant.

The charge threshold thrch is compared to a voltage ramp to generate a charge pulse of the required duration to achieve the peak demand current (ip). The peak demand current ip is set to maintain voltage regulation at the output by the voltage control loop. Therefore, Tch is only required to be proportional to ip. The peak current (ip limitation of inductor current) required for voltage regulation is virtual in the design; that is, it need not appear anywhere in the implementation. It is shown in the system model merely for clarification of the concept.

The ramp generator includes a (PSPICE) DC expression-to-current Analog Behavioral Model block ABMI3 256, a ramp capacitor C3 258, and transistor M3 280. The DC current in this case is scaled at the switching frequency (Freq) times 10p. This current source into C3 will generate a voltage ramp with a slope of 1V per μSec. The ramp generator voltage (ramp) is compared to the charge duration threshold (thrch) to set the charge period, and to the period duration threshold (thrp) to set the operating frequency of the regulator. The transistor M3 280 is used as a switch to discharge the capacitor C3 258 at the end of each charge-transfer cycle.

H. Convergence Generator

A model of a convergence generator circuit 251 is shown in FIG. 22 (as also shown in FIG. 20). The convergence generator overcomes the instability for duty cycles greater than 50% without the use of slope correction by perturbing the operating frequency of regulator to degenerate the unstable mode of operation. The effect of the convergence generator 251 is shown in FIG. 23, showing variation in the operating frequency. The convergence generator 251 includes a filter version of ims (imsf) provided by a resistor R13 252 and a capacitor C8 254, and a lead-lag term that perturbs the operating period threshold (thrp). This lead-lag term is 1-(ims–imsf)/3. Note that in steady state (where ims=imsf) the operating period threshold is 1, which corresponds to 1 MHz switching frequency with the present scaling of the ramp generator (1V per μSec). Therefore, the system is centered at a 1 MHz operating frequency. Since instability from sub-harmonic oscillations at duty cycle greater than 50% is induced by noise in the system, the scaling factor of ⅓ can be trimmable to obtain the most stable operating frequency given a particular level of system noise. A trimmed gain of this term is desirable because system noise is not well modeled in the power supply design. Any suitable gain may be used.

As noted previously, convergence is achieved by increasing the switching frequency (i.e., shortening the discharge period) whenever ims experiences an abrupt increase, and decreasing the switching frequency (i.e., lengthening the discharge period) whenever ims experiences an abrupt decrease. This constitutes degenerative feedback because it prevents ims from further divergence in successive cycles.

The convergence generator 251 avoids divergence by letting the operating frequency vary so that as ims increases abruptly due to a noise, and the charge period is decreased, the switching frequency is increased. This means that the discharge cycle does not increase as much. The duty sees less of a variation. In other words, the convergence generator degenerates the negative effects of current mode control for duty cycles greater than 50%. Since slope correction is avoided, the output filter also remains single order (RC).

I Transitional Modes

Referring to FIG. 24, transition modes are used to accelerate the transition of vo when vod changes. Tranup is asserted if the filtered vo (namely, vof) is less than the filtered demand signal (vodf1) by more than 200 mV, and vodf1 is greater than 2V. When tranup is asserted, the boost mode charge cycle is enabled, which decreases the time required to charge the inductor L1 154 (shown in FIG. 7). This feature improves the upward slew-rate of the regulator.

Trandn is asserted if the filtered vo (namely, vof) is 200 mV greater than the filtered demand signal, and vodf1 is less than 680 mV. When trandn is asserted, the buck transfer cycle is enabled. This decreases the time required to discharge the inductor L1 154 and output filter capacitor C1 168 (shown in FIG. 14), and improves the downward slew-rate of the regulator.

J. Input Test Vectors

Three input test vector circuit portions 310, 320, 330 for the present embodiment are shown in FIG. 25. A first input test vector portion 310 including a voltage source V5 312 generates a signal vi that is used to turn on the input supply of the power plant circuit shown in FIG. 7. A second input test vector portion 320 including a voltage source V6 322 generates a reset signal rst that is used in the charge duration extrapolation circuit provided in FIG. 20. A third input test vector portion 330, including voltage sources V4 334 and V7 332, a resistor R20 336 and a capacitor C11 338, is used to create a pulse waveform for the demand signal of the voltage feedback loop provided in FIG. 11.

K. Response Characteristics

FIGS. 26-34 provide various waveforms depicting response characteristics of the system utilizing an ECM power converter according the present embodiment to demonstrate operation of the system. FIG. 26 provides two Bode plots showing the open loop frequency response of the DC-DC switched mode power supply including an ECM power converter according to the present embodiment. The upper plot of FIG. 26 provides the magnitude response of each element in the system model of the system described in connection with FIGS. 7-25. The lower plot of FIG. 26 shows the contribution of each system element to the overall system response. The unity gain cross over frequency of the voltage loop is 75 kHz and the phase margin is 54 degrees. The gain margin is greater than 20 dB.

Figure 29:
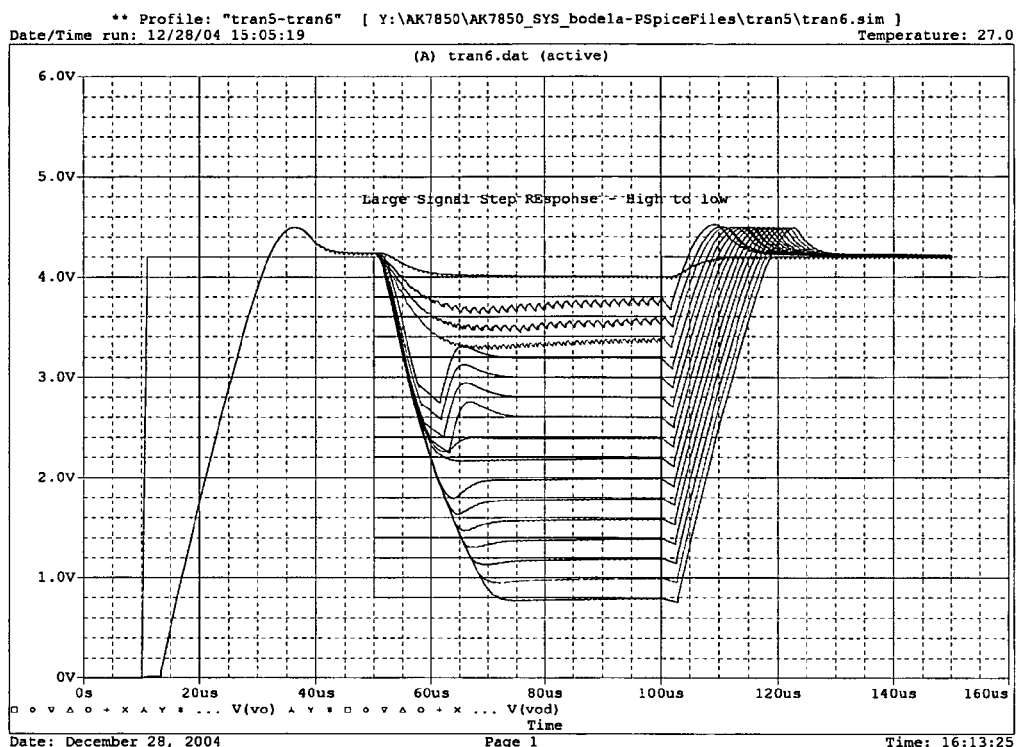
FIG. 29 depicts PSPICE simulation results including a plot of large signal step transient response (high to low) for voltages V(vo) and V(vod) of a DC-DC switched mode power supply including an ECM power converter according to the second embodiment.
Figure 30:
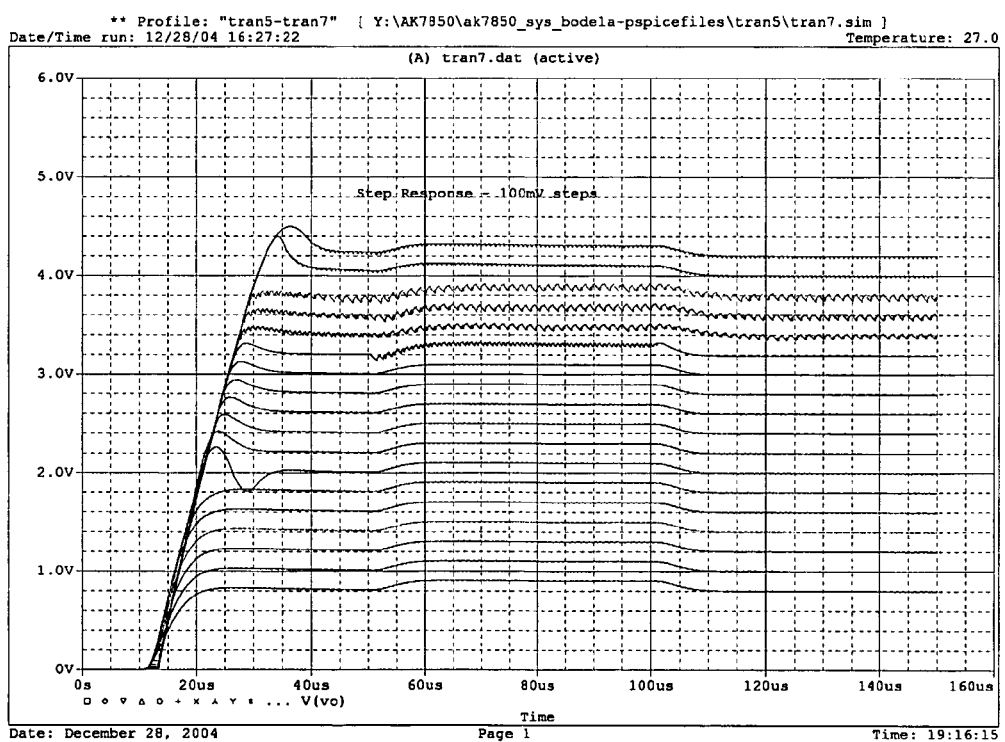
FIG. 30 depicts PSPICE simulation results including a plot of step transient response in 100 mV steps for voltage V(vo) of a DC-DC switched mode power supply including an ECM power converter according to the second embodiment.
Figure 31:
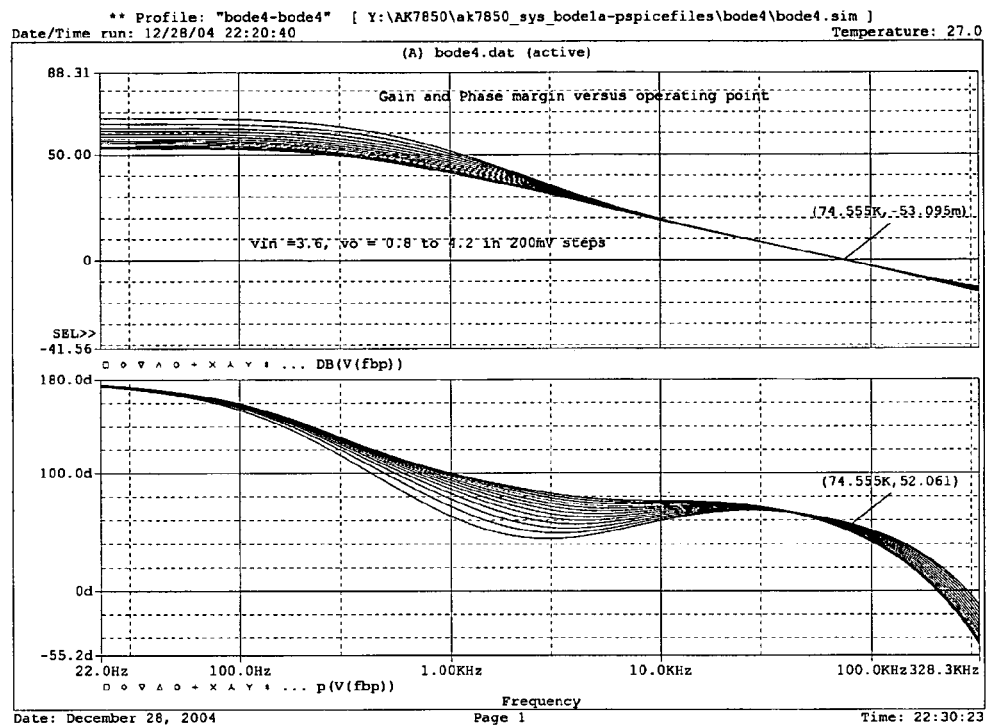
FIG. 31 depicts PSPICE simulation results including a Bode plot of gain versus frequency in the upper window, and a Bode plot of phase margin versus frequency in the lower window, both of a DC-DC switched mode power supply including an ECM power converter according to the second embodiment.
Figure 32:
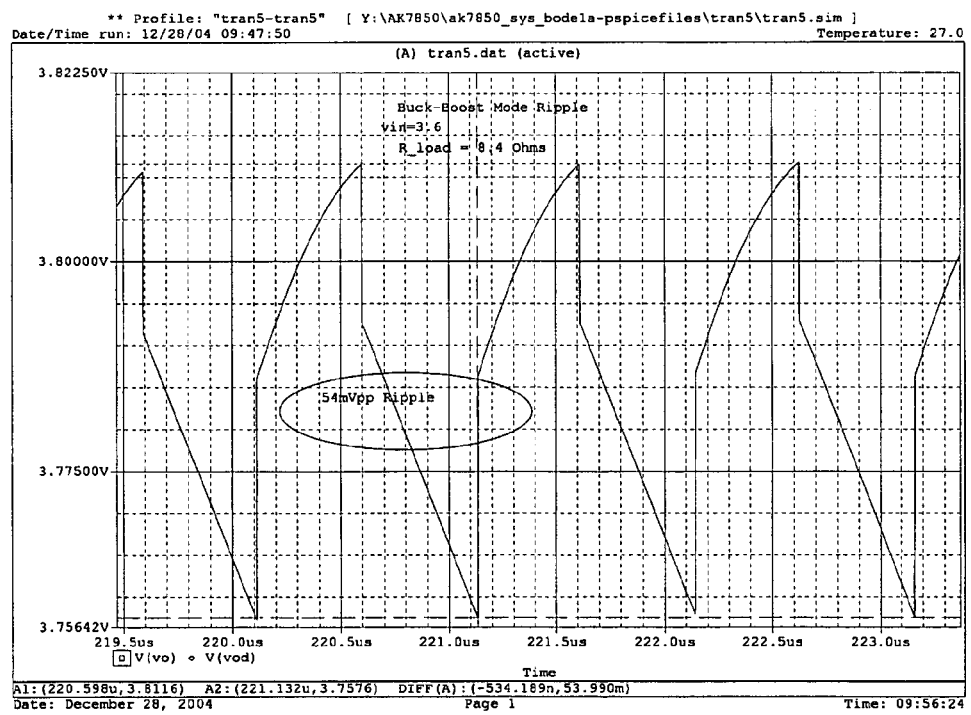
FIG. 32 depicts PSPICE simulation results including the buck-boost mode output ripple of a DC-DC switched mode power supply including an ECM power converter according to the second embodiment.
Figure 33:
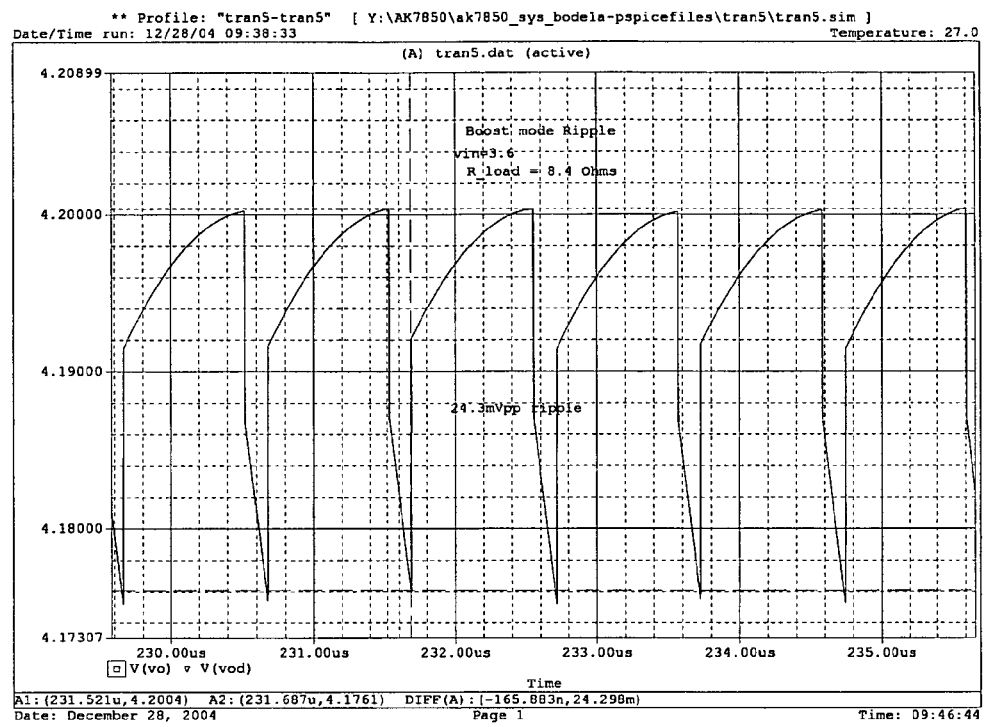
FIG. 33 depicts PSPICE simulation results including the boost mode output ripple of a DC-DC switched mode power supply including an ECM power converter according to the second embodiment.
Figure 34:
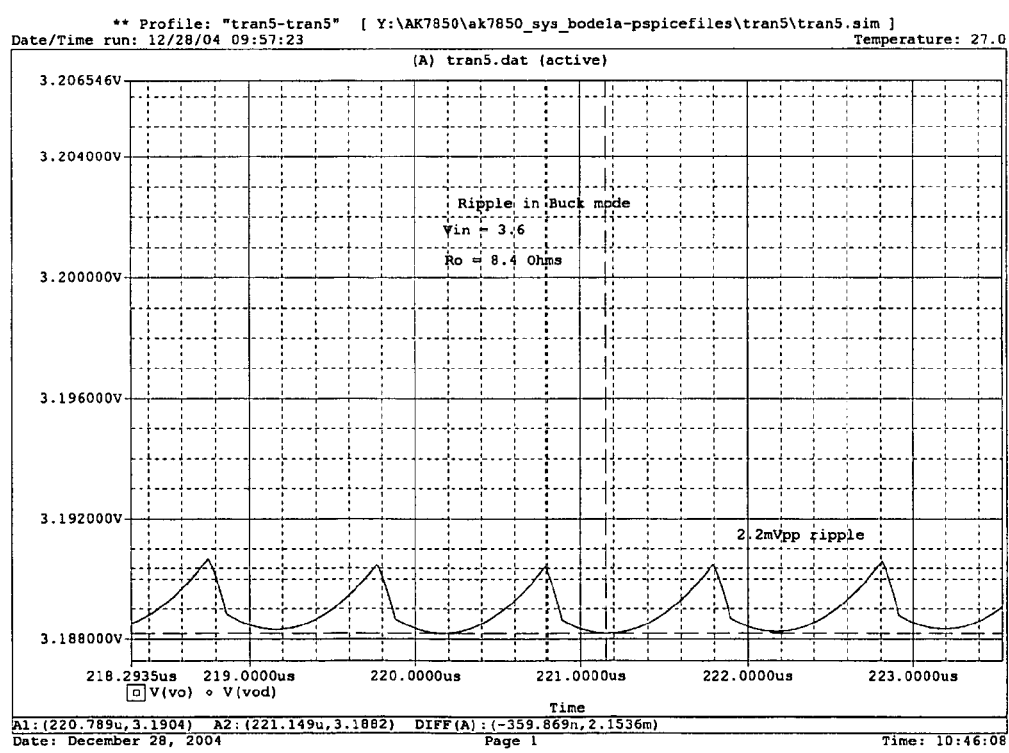
FIG. 34 depicts PSPICE simulation results including the buck mode output ripple of a DC-DC switched mode power supply including an ECM power converter according to the second embodiment.

FIG. 27 is a plot of large signal step transient response (low to high) for voltages V(vo) and V(vod). FIG. 28 provides a plot of inductor current I(L1) transient response in the upper window, and a corresponding plot of large signal step response (low to high) for voltage V(vo). FIG. 29 is a plot of large signal step transient response (high to low) for voltages V(vo) and V(vod). FIG. 30 is a plot of step transient response in 100 mV steps for voltage V(vo). FIG. 31 depicts a Bode plot of gain versus frequency in the upper window, and a Bode plot of phase margin versus frequency in the lower window. FIGS. 32-34 depict the buck-boost mode output ripple, the boost mode output ripple, and the buck mode output ripple, respectively, of DC-DC switched mode power supply including an ECM power converter according to the present embodiment.

L. Demonstration of Convergence Generator

Figure 35:
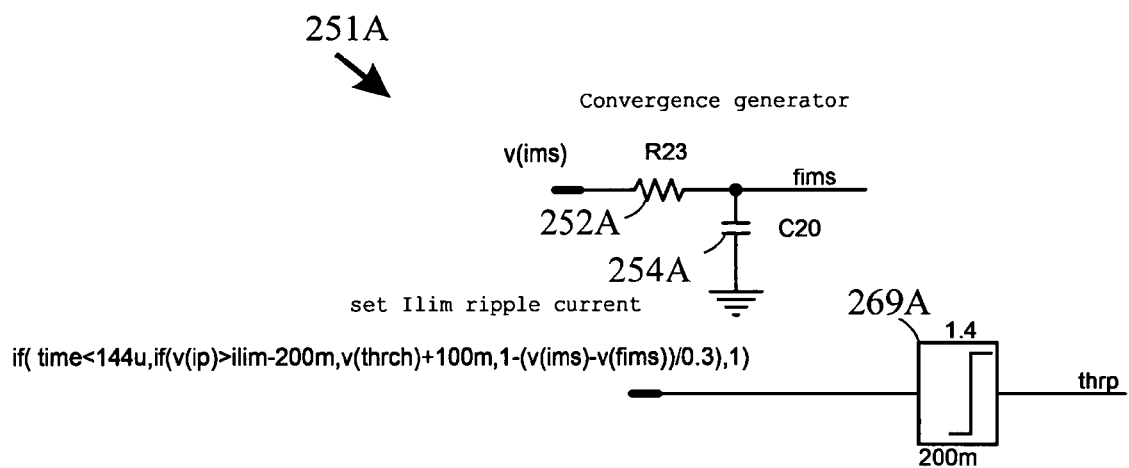
FIG. 35 is a PSPICE Analog Hardware Description Language circuit model for at least a portion of a convergence generator of a DC-DC switched mode power supply including an ECM power converter according to the second embodiment, similar to the convergence generator shown in FIG. 22 but including different conditional statements and parameter values to yield the simulation results illustrated in FIGS. 36-37.

Substantially the same convergence generator as was depicted in FIG. 22 is provided in FIG. 35, but including different conditional statements and parameter values to demonstrate the operation of a DC-DC switched-mode power supply including an ECM power converter with an active convergence generator versus such a power supply having an ECM power converter with the convergence generator inactivated. The convergence generator 251A includes a resistor R23 252A, a capacitor C20 254A, and a (PSPICE) Analog Behavioral Model voltage limiter block 269A. PSPICE simulation results for the operation of the power supply without and with operation of the convergence generator are provided in FIG. 36 and FIG. 37, respectively.

Figure 36:
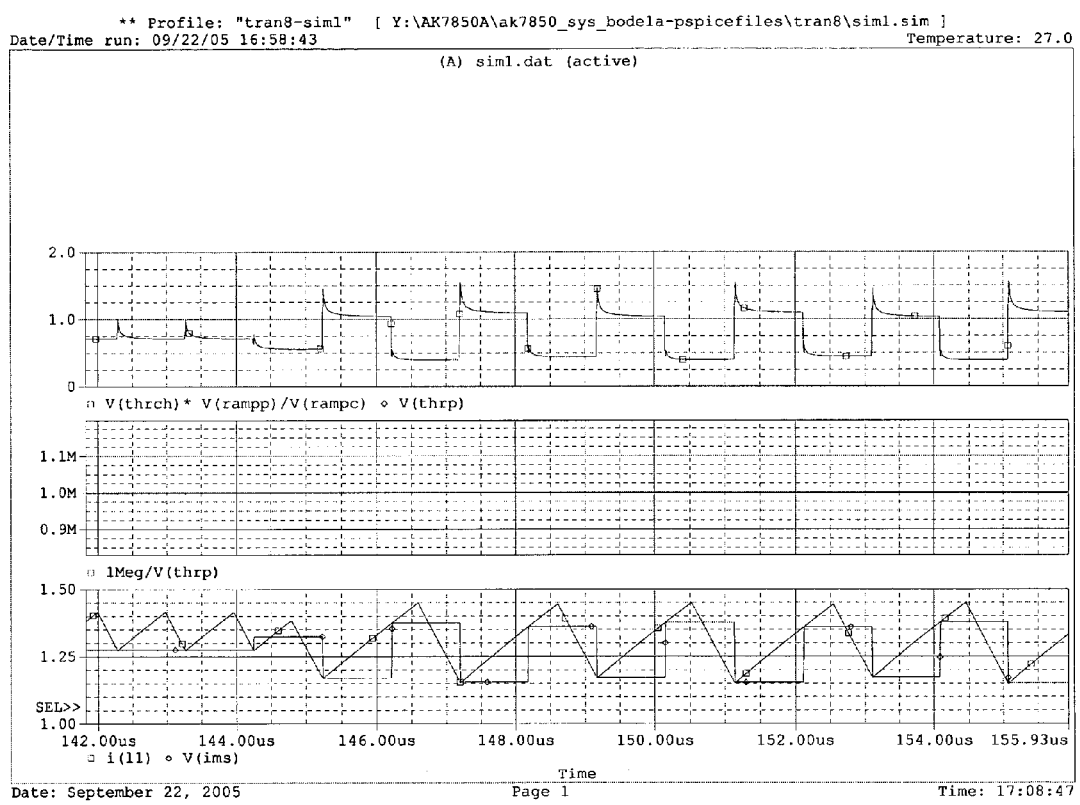
FIG. 36 depicts PSPICE simulation results including time-dependent plots or waveforms for several parameters of a DC-DC switched mode power supply including an ECM power converter according to the second embodiment in boost mode but with the convergence generator portion deactivated (i.e., to approximate a conventional power supply exhibiting unstable behavior at duty cycles greater than 50%), with the upper window depicting both duty cycle (V(thrch) *V(ramp)/V(rampc)) and period (V(thrp)), the middle window depicting switching frequency, and the lower window depicting both inductor current (i(l1)) and minimum inductor current sample (V(ims)).

FIG. 36 depicts PSPICE simulation results including time-dependent plots or waveforms for several parameters of a DC-DC switched mode power supply including an ECM power converter operating in boost mode according to the second embodiment in boost mode but with the convergence generator portion deactivated (i.e., to approximate a conventional power supply exhibiting unstable behavior at duty cycles greater than 50%), with the upper window depicting both duty cycle (V(thrch)*V(ramp)/V(rampc)) and period (V(thrp)), the middle window depicting switching frequency, and the lower window depicting both inductor current (i(l1)) and minimum inductor current sample (V(ims)). All three of these windows are time linked. A perturbation is introduced to the system at 144 microseconds, causing the minimum inductor current sample V(ims) to oscillate. At a constant operating frequency (as shown in the middle window), the system experiences wide swings in inductor current and is unable to return to the desired operating state shown before 144 microseconds.

Figure 37:
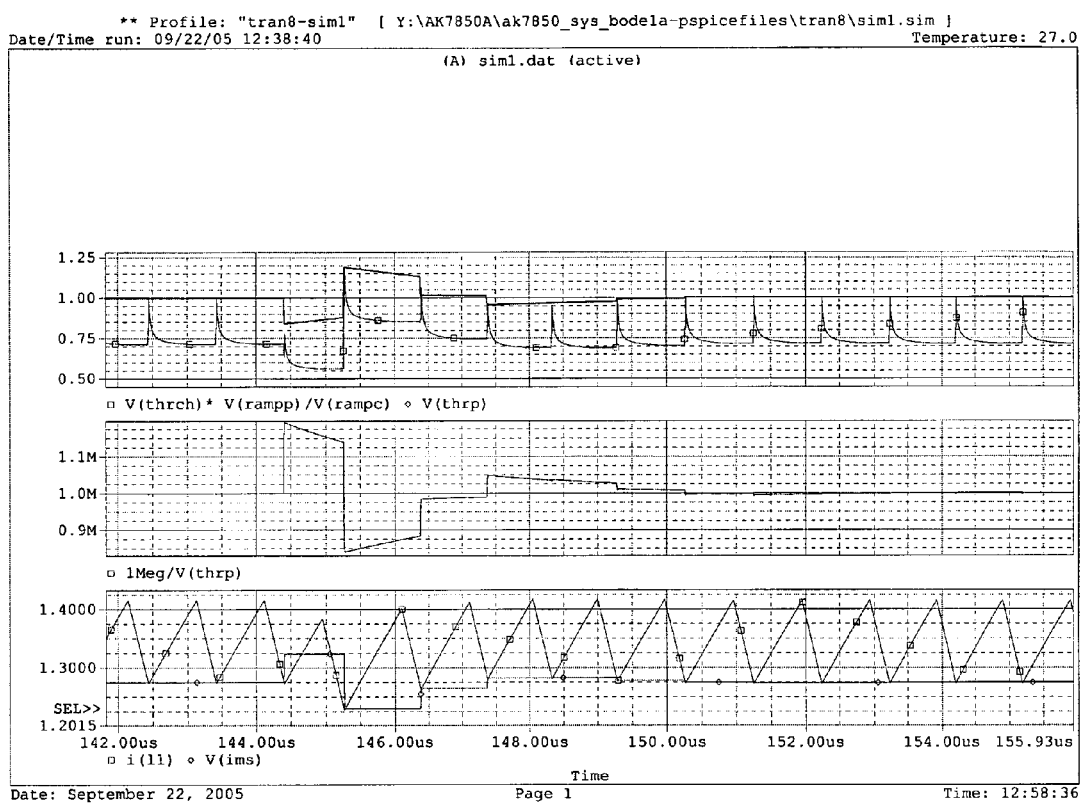
FIG. 37 depicts PSPICE simulation results including time-dependent plots or waveforms for the same parameters as FIG. 36, but for a DC-DC switched mode power supply including an ECM power converter in boost mode according to the second embodiment but with the convergence generator portion active.

FIG. 37 depicts PSPICE simulation results including time-dependent plots or waveforms for the same parameters as FIG. 36, but for a DC-DC switched mode power supply including an ECM power converter in boost mode according to the second embodiment but with the convergence generator portion active. The perturbation introduced at 144 microseconds causes the operating frequency to vary, as shown in the middle window. Within approximately three microseconds, stable operation substantially the same as experienced before 144 microseconds is resumed. Thus, the ability of the convergence generator to resist unstable operation at elevated duty cycles (greater than 50%) is demonstrated.

While the invention has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. An extrapolative conductance mode power converter having an associated energy storage element arrangeable between a source and a load, wherein:
    the power converter is adapted to supply at least one pulse of energy having a charge duration to the energy storage element during a charging mode;
    the power converter is adapted to permit the energy storage element to discharge at least one pulse of energy having a discharge duration during a discharging mode;
    the power converter is adapted to switch between charging mode and discharging mode while providing a regulated output current to the load; and
    the power converter is adapted to extrapolate the charge duration without continuous current monitoring.

2. The power converter of claim 1, further comprising a convergence generator adapted to alter the discharge duration, wherein the sum of the charge duration and the discharge duration is permitted to vary when the power converter is in a non-steady state.

3. The power converter of claim 1 wherein the power converter is adapted to operate at a duty cycle of greater than 50% and remain stable.

4. The power converter of claim 1, wherein the power converter is adapted to provide DC-DC conversion utility.

5. The power converter of claim 1, wherein the power converter is adapted to provide AC-DC conversion utility.

6. A switched mode power supply comprising the power converter of claim 1.

7. The switched mode power supply of claim 6, wherein: the power converter includes a switchable inductor; the power supply is adapted to operate in buck mode, boost mode, and transition mode; and the inductor engages in switched operation in buck mode and boost mode, and engages in unswitched operation in transition mode.

8. An electronic device comprising the power converter of claim 1.

9. The electronic device of claim 8 wherein the device is battery operated.

10. An integrated circuit comprising the power converter of claim 1.

11. A driver for any of a light-emitting diode and a laser, the driver comprising the power converter of claim 1.

12. A laser system including a laser and the driver of claim 11.

13. A light-emitting diode system including the driver of claim 11 and any of a light emitting diode and a light emitting diode array.

14. A battery charger including the power converter of claim 1.

15. A power factor controller including the power converter of claim 1.

16. The power converter of claim 1 wherein the current is periodically sampled, and the current sampling period is less than about 2% of the charge duration.

17. The power converter of claim 1 wherein the power converter has a peak inductor current of less than about 1 ampere, a gain of at least about 10 volts per ampere, and a peak power loss of less than about 10 watts.

18. A conductance mode power converter having an associated energy storage element arrangeable between a source and a load, wherein the power converter is adapted to supply at least one pulse of energy having a charge duration to the energy storage element during a charging mode, the power converter is adapted to permit the energy storage element to discharge at least one pulse of energy having a discharge duration during a discharging mode, and the power converter is arranged to switch between charging mode and discharging mode while providing a regulated output current to the load, wherein the power converter employs periodic current sampling and utilizes the sampled current to extrapolate the charge duration.

19. The power converter of claim 18, further comprising a convergence generator adapted to alter the discharge duration, wherein the sum of the charge duration and the discharge duration is permitted to vary when the power converter is in a non-steady state.

20. The power converter of claim 18 wherein the current sampling period is less than about 2% of the charge duration.

21. A switched mode power supply comprising the power converter of claim 18.

22. The switched mode power supply of claim 21, wherein: the power converter includes a switchable inductor; the power supply is adapted to operate in buck mode, boost mode, and transition mode; and the inductor engages in switched operation in buck mode and boost mode, and engages in unswitched operation in transition mode.

23. An electronic device comprising the power converter of claim 18.

24. A conductance mode power converter having an associated energy storage element arrangeable between a source and a load, wherein the power converter is adapted to supply at least one pulse of energy having a charge duration to the energy storage element during a charging mode, the power converter is adapted to permit the energy storage element to discharge at least one pulse of energy having a discharge duration during a discharging mode, and the power converter is arranged to switch between charging mode and discharging mode while providing a regulated output current to the load, wherein the power converter has a charge duration and a discharge duration, and the power converter comprises a convergence generator adapted to alter the discharge duration, wherein the sum of the charge duration and the discharge duration is permitted to vary when the power converter is in a non-steady state.

25. The power converter of claim 24 wherein the power converter is adapted to operate at a duty cycle of greater than 50% and remain stable.

26. The power converter of claim 24 wherein the current is periodically sampled, and the current sampling period is less than about 50% of the charge duration.

27. The power converter of claim 24 wherein the current is periodically sampled, and the current sampling period is less than about 2% of the charge duration.

28. The power converter of claim 24, wherein the power converter is adapted to provide DC-DC conversion utility.

29. The power converter of claim 24, wherein the power converter is adapted to provide AC-DC conversion utility.

30. A switched mode power supply comprising the power converter of claim 24.

31. The switched mode power supply of claim 30, wherein: the power converter includes a switchable inductor; the power supply is adapted to operate in buck mode, boost mode, and transition mode; and the inductor engages in switched operation in buck mode and boost mode, and engages in unswitched operation in transition mode.

32. An electronic device comprising the power converter of claim 24.

33. The electronic device of claim 32 wherein the device is battery operated.

34. An integrated circuit comprising the power converter of claim 24.

35. A driver for any of a light-emitting diode and laser, the driver comprising the power converter of claim 24.

36. A laser system including a laser and the driver of claim 35.

37. A light-emitting diode system including the driver of claim 35 and any of a light emitting diode and a light emitting diode array.

38. A battery charger including the power converter of claim 24.

39. A power factor controller including the power converter of claim 24.

40. A conductance mode power converter having a regulated output and having an associated energy storage element arrangeable between a source and a load, wherein the power converter is adapted to supply at least one pulse of energy having a charge duration to the energy storage element during a charging mode, the power converter is adapted to permit the energy storage element to discharge at least one pulse of energy having a discharge duration during a discharging mode, and the power converter is arranged to switch between charging mode and discharging mode while providing a regulated output current to the load, wherein the output is regulated without monitoring peak current.

41. The power converter of claim 40, further comprising a convergence generator adapted to alter the discharge duration, wherein the sum of the charge duration and the discharge duration is permitted to vary when the power converter is in a non-steady state.

42. A switched mode power supply comprising the power converter of claim 40.

43. An electronic device comprising the power converter of claim 40.

44. A conductance mode power converter having a regulated output and having an associated energy storage element arrangeable between a source and a load, wherein the power converter is adapted to supply at least one pulse of energy having a charge duration to the energy storage element during a charging mode, the power converter is adapted to permit the energy storage element to discharge at least one pulse of energy having a discharge duration during a discharging mode, and the power converter is arranged to switch between charging mode and discharging mode while providing a regulated output current to the load, wherein the output is regulated without continuous current monitoring during the charging mode.

45. The power converter of claim 44, further comprising a convergence generator adapted to alter the discharge duration, wherein the sum of the charge duration and the discharge duration is permitted to vary when the power converter is in a non-steady state.

46. A switched mode power supply comprising the power converter of claim 44.

47. An electronic device comprising the power converter of claim 44.

48. A conductance mode power converter having an associated energy storage element arrangeable between a source and a load, wherein the power converter is adapted to supply at least one pulse of energy having a charge duration to the energy storage element during a charging mode, the power converter is adapted to permit the energy storage element to discharge at least one pulse of energy having a discharge duration during a discharging mode, and the power converter is adapted to switch between charging mode and discharging mode during operation of the power converter while providing a regulated output current to the load, wherein the charge duration is established by a demand signal and at least one discrete current sample.

49. The power converter of claim 48 wherein the charge duration is variable.

50. The power converter of claim 48, further comprising a convergence generator adapted to alter the discharge duration, wherein the sum of the charge duration and the discharge duration is permitted to vary when the power converter is in a non-steady state.

51. A switched mode power supply comprising the power converter of claim 48.

52. An electronic device comprising the power converter of claim 48.

53. A conductance mode power converter having an associated energy storage element arrangeable between a source and a load, wherein the power converter is adapted to supply at least one pulse of energy having a charge duration to the energy storage element during a charging mode, the power converter is adapted to permit the energy storage element to discharge at least one pulse of energy having a discharge duration during a discharging mode, and the power converter is adapted to switch between charging mode and discharging mode during operation of the power converter while providing a regulated output current to the load, wherein the power converter has an inductor current subject to vary relative to a target current, and wherein the charge duration is established prior to the inductor current exceeding the target current.

54. The power converter of claim 53, further comprising a convergence generator adapted to alter the discharge duration, wherein the sum of the charge duration and the discharge duration is permitted to vary when the power converter is in a non-steady state.

55. A switched mode power supply comprising the power converter of claim 53.

56. An electronic device comprising the power converter of claim 53.

57. The power converter of claim 1, comprising said energy storage element, wherein said energy storage element comprises at least one of a charge storage element and a magnetic flux energy storage element.

58. The power converter of claim 18, comprising said energy storage element, wherein said energy storage element comprises at least one of a charge storage element and a magnetic flux energy storage element.

59. The power converter of claim 24, comprising said energy storage element, wherein said energy storage element comprises at least one of a charge storage element and a magnetic flux energy storage element.

60. The power converter of claim 40, comprising said energy storage element, wherein said energy storage element comprises at least one of a charge storage element and a magnetic flux energy storage element.

61. The power converter of claim 44, comprising said energy storage element, wherein said energy storage element comprises at least one of a charge storage element and a magnetic flux energy storage element.

62. The power converter of claim 48, comprising said energy storage element, wherein said energy storage element comprises at least one of a charge storage element and a magnetic flux energy storage element.

63. The power converter of claim 53, comprising said energy storage element, wherein said energy storage element comprises at least one of a charge storage element and a magnetic flux energy storage element.

* * * * *